United States Patent
Katoh et al.

[11] Patent Number: 5,949,757
[45] Date of Patent: Sep. 7, 1999

[54] PACKET FLOW MONITOR AND CONTROL SYSTEM

[75] Inventors: Masafumi Katoh; Takeshi Kawasaki; Naotoshi Watanabe; Tetsuya Nishi; Toshio Soumiya; Koji Nakamichi; Tomohiro Ishihara; Michio Kusayanagi; Masato Okuda, all of Kanagawa, Japan

[73] Assignee: Fujitsu Limited, Kanagawa, Japan

[21] Appl. No.: 08/726,749

[22] Filed: Oct. 7, 1996

[30] Foreign Application Priority Data

Nov. 27, 1995 [JP] Japan ................................. 7-307971

[51] Int. Cl.⁶ ........................... G01R 31/08; G08C 15/00
[52] U.S. Cl. ............................................ 370/232; 370/253
[58] Field of Search ................................. 370/231, 232, 370/233, 234, 229, 395, 230, 252, 253, 397, 468

[56] References Cited

U.S. PATENT DOCUMENTS

| | | | |
|---|---|---|---|
| 4,769,810 | 9/1988 | Eckberg et al. | 370/232 |
| 5,007,043 | 4/1991 | van den Dool et al. | 370/232 |
| 5,132,966 | 7/1992 | Hayano et al. | 370/233 |
| 5,394,396 | 2/1995 | Yoshimura et al. | 370/236 |
| 5,812,526 | 9/1998 | Chang et al. | 370/230 |

OTHER PUBLICATIONS

"A PROTOCOL AND PROTOTYPE FOR BROADBAND SUBSCRIBER ACCESS TO ISDNs" IEEE(NEW YORK, US) Mar. 15–20, 1987 pp. 462–469.

Primary Examiner—Michael Horabik
Assistant Examiner—Kevin C. Harper
Attorney, Agent, or Firm—Helfgott & Karas, PC

[57] ABSTRACT

An ATM connection is a virtual communication path specified by VPI/VCI. A plurality of ATM connections that are directed to the same output line is defined as an ATM connection group. A connection UPC (Usage Parameter Control) facility is provided for each of the ATM connections and a connection group UPC facility is provided for the ATM connection group. The connection UPC facilities and the connection group UPC facility are operated in either the monitor mode or the control mode. In the monitor mode, when the rate of flow of packets into a network exceeds a threshold, a control unit is informed of it, but cells are allowed to enter the network as they are. In the control mode, when the rate of flow of cells into the network exceeds the threshold, cells the flow rate of which exceeds the threshold are discarded.

29 Claims, 26 Drawing Sheets

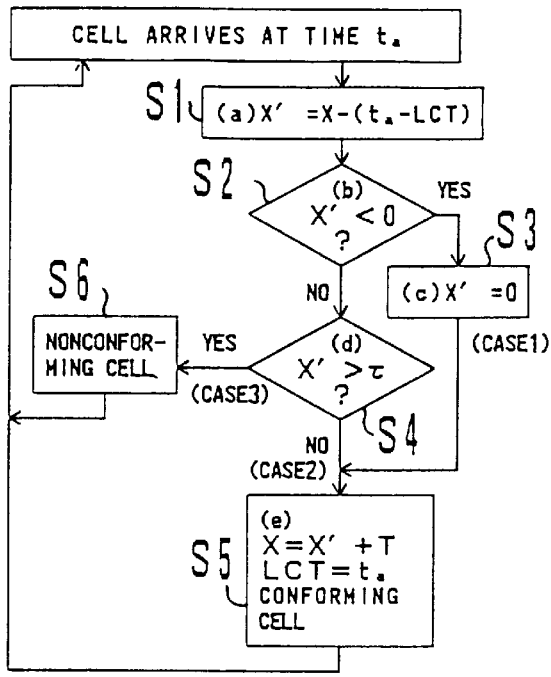
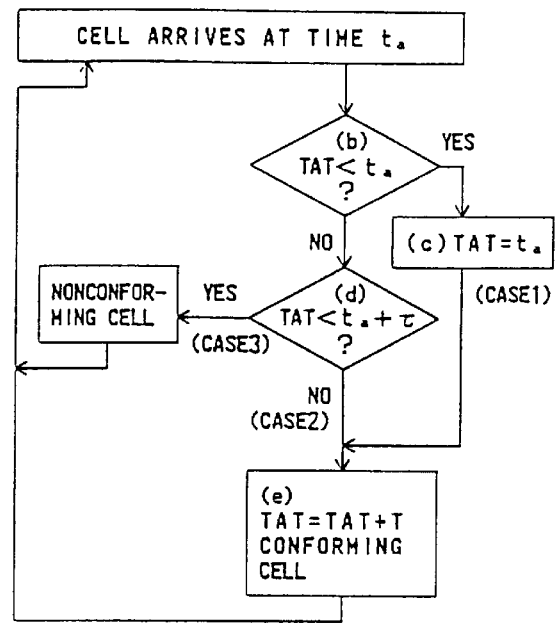
FIG. 18A
FIG. 18B

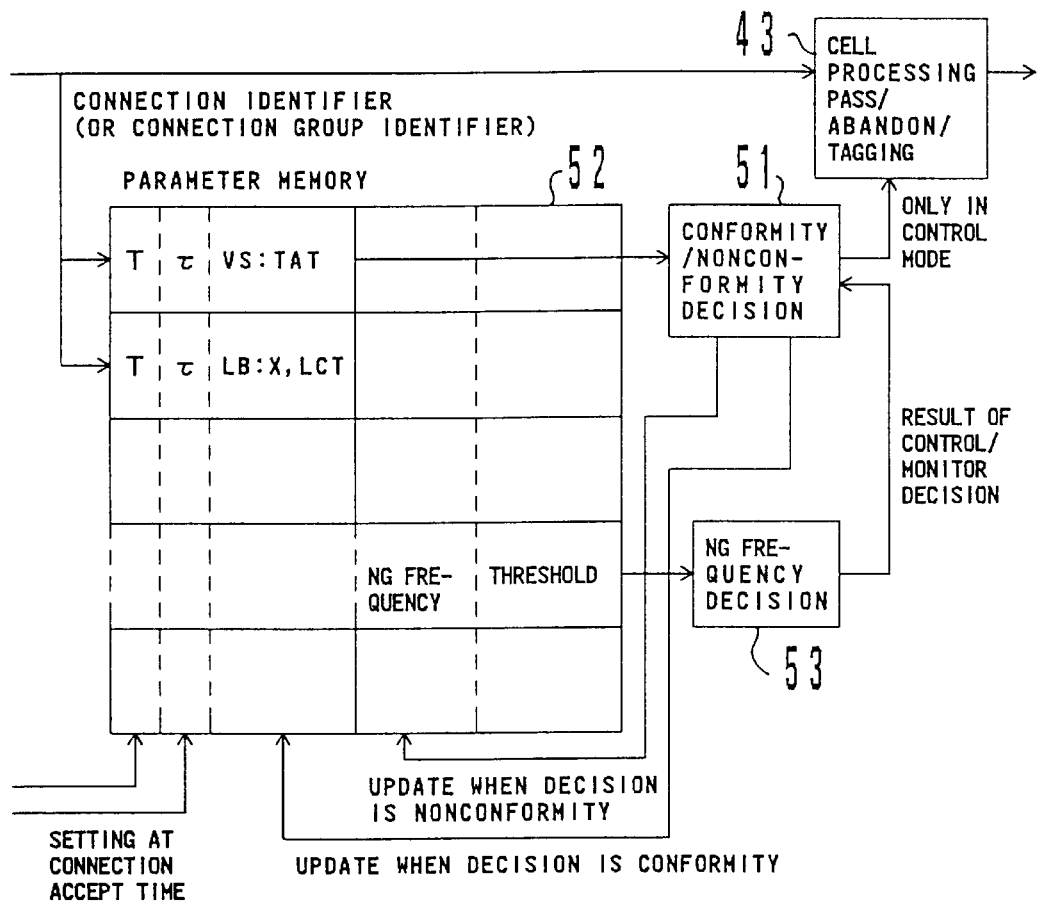
F I G. 20

PACKET FLOW MONITOR AND CONTROL SYSTEM

BACKGROUND OF THE INVENTION

1. Field of the Invention

The invention relates to a system for monitoring the rate of flow of packets on a network, and more specifically to a system for monitoring and controlling the rate of flow of cells into an ATM network.

2. Description of the Related Art

In recent years, communications services that uniformly treat various forms of communications of voice data, text data, video data, and so on have become essential. As a core technology for such communications services, ATM (Asynchronous Transfer Mode) has been researched and developed.

In ATM, information is transferred on a cell-by-cell basis, each cell consisting of a 48-octet payload and control information (including routing information) called a header. Upon receipt of a cell from a source terminal, an ATM network routes the cell to a destination terminal in accordance with routing information stored in its header.

In ATM, when a call connection is made, the transfer rate (the bandwidth that the call uses) in that connection is declared. The ATM network makes a decision of whether the connection can be established at the declared transfer rate by means of its CAC (Connection Admission Control) function. If the connection cannot be established, the call connection request is refused.

The source terminal normally outputs cells so as not to exceed a transfer rate declared for each connection. If the actual cell transfer rate in each connection is the declared transfer rate or less, cells will not be discarded in the ATM network. However, if cells are output at a rate exceeding the declared transfer rate in some connections, then the ATM network will be congested, resulting in discarding of cells.

In this case, it is not certain that in which connections cells are discarded. Therefore, it is also quite possible that cell discarding occurs even in connections that do not exceed the declared transfer rate.

In order to avoid such a problem, it is required to monitor the flow of cells into the ATM network at its input port and, if there is a connection having a cell flow rate that exceeds the declared flow rate, to discard cells that are transferred over that connection. In general, such monitoring is performed by a UPC (Usage Parameter Control) facility installed in an UNI (User Network Interface) at the input port of the ATM network. The UPC facility monitors the flow rate of cells for each connection and, when there is a connection having a cell flow rate in excess of the declared rate, discards nonconforming cells that are transferred over that connection or sets their CLP (Cell Loss Priority) bit to non-priority state so that their priority is decreased.

The use of the UPC facility to control the discard of nonconforming cells permits declared transfer rates to be observed in all the connections in the ATM network. With the system in which the CLP bit of nonconforming cells is set to non-priority state, when network congestion occurs, non-priority cells are discarded in the ATM network, and consequently cells associated with a connection having a cell flow rate over its declared rate will be discarded.

In an ATM network, a plurality of connections can be established on one physical link (or one virtual path). Suppose that two connections are established on one physical link and the cell transfer rate in the first connection is sufficiently low in comparison with its declared transfer rate. And when it is desired to transfer cells over the second connection at a transfer rate exceeding its declared transfer rate, it becomes possible to provide a cell transfer service at a transfer rate higher than the declared transfer rate by transferring part of cells to be transferred over the second connection over the first connection. According to such a service, the transfer rate of each connection can be increased without broadening the bandwidth of the physical link, permitting efficient utilization of ATM network resources.

However, in the conventional configuration which uses the UPC facility to discard nonconforming cells for each connection as described above, the transfer rate in each connection is not allowed to exceed its declared transfer rate and, even if a low-usage connection is present on the same physical link, another connection cannot utilize the bandwidth of that connection. For this reason, a request for efficient utilization of ATM network resources cannot be satisfied.

Note that the above-described problem arises in packet networks as well as ATM networks.

SUMMARY OF THE INVENTION

It is an object of the invention to provide a packet flow-rate monitor and control system which permits packet discarding to be suppressed while making efficient utilization of network resources.

According to an aspect of the invention there is provided a packet flow rate monitor and control system for monitoring and controlling the rate of flow of fixed-length packets into a network which routes each of the packets according to routing information placed in it. The system includes following means. Connection monitor means, provided for each of connections, monitors the rate of flow of packets transferred over the corresponding connection. Connection group monitor means, provided for each of connection groups which are each composed of at least one connection, monitors the rate of flow of packets transferred over the corresponding connection group. Control means for causing the connection monitor means and the connection group monitor means to operate in either a monitor mode or a control mode. In the monitor mode, the connection monitor means and the connection group monitor means monitor whether or not the rate of flow of packets exceeds a threshold set in advance. In the control mode, when the rate of flow of packets exceeds the threshold, the connection monitor means and the connection group monitor means discard packets the flow rate of which exceeds the threshold. The control means causes the connection group monitor means to operate in the control mode and the connection monitor means to operate in the monitor mode. Packet flow rate in regulated by the unit of connection group, so congestion does not occur. A bandwidth of the connection group is allocated to connections which belong to the connection group. A connection can transfer at a rate higher than the threshold for the connection by using a bandwidth allocated for another connection which belongs to the same connection group.

BRIEF DESCRIPTION OF THE DRAWINGS

FIG. 18A is a flowchart for the cell conformity/nonconformity decision in the leaky bucket system;

FIG. 18B is a flowchart for the cell conformity/nonconformity decision using a virtual scheduling method;

FIG. 20 shows an arrangement of the UPC/NPC in the embodiment;

DETAILED DESCRIPTION OF THE PREFERRED EMBODIMENT

Figure 1:
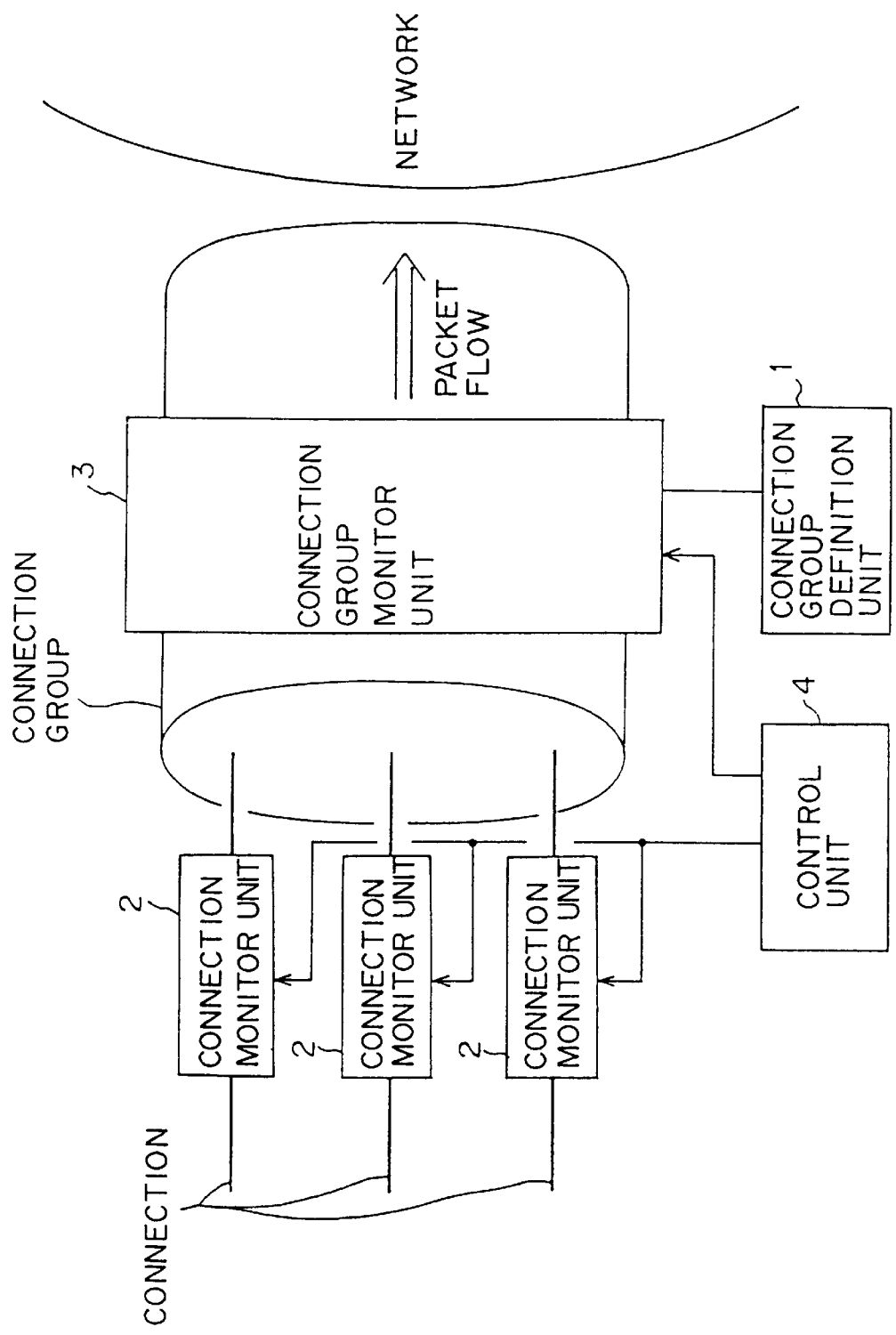
FIG. 1 is a diagram illustrating the principles of the invention.

FIG. 1 illustrates the principles of the invention. The invention is directed to a packet flow-rate monitor and control system which monitors and controls the rate of flow of fixed-length packets into a network (e.g., ATM network) that routes fixed-length packets according to routing information stored in them and includes the following units.

A connection group definition unit 1 defines a connection group composed of multiple connections. A connection monitor unit 2, which is provided for each connection, monitors the rate of flow of packets that are transferred over the corresponding connection. A connection group monitor unit 3, which is provided for each of connection groups defined by the connection group definition unit 1, monitors the rate of flow of packets that are transferred over the corresponding connection group.

A control unit 4 causes the connection monitor units 2 and the connection group monitor unit 3 to operate in either the monitor mode or control mode. The monitor mode is one to monitor whether or not the rate of flow of packets exceeds a predetermined threshold. The control mode is one to, when the rate of flow of packets exceeds the threshold, discard packets that exceeds the threshold or decrease the priority of packets that exceeds the threshold.

In the normal mode (non-congestion state), the control unit 4 causes the connection monitor unit 2 to operate in the monitor mode and the connection group monitor unit 3 to operate in the control mode. This permits the rate of flow of packets into the network to be regulated on a connection group basis, preventing the network from becoming congested. In this case, the flow rate of packets is not regulated on a connection-by-connection basis, which permits the bandwidth allocated to a connection group to be optionally allocated for the connections that belong to that connection group.

When a certain connection group becomes congested (i.e., when the flow rate of packets in a certain connection group exceeds its threshold), the control unit 4 detects a connection in that connection group that exceeds the threshold in packet flow rate according to monitoring results of the connection monitor units 2. Then the control unit 4 changes an operation mode of a corresponding connection monitor unit 2 provided for the detected connection from the monitor mode to the control mode. According to such a system, it becomes possible to regulate the rate of flow of packets only for connections that exceed declared parameters.

Hereinafter, embodiments of the invention will be described with reference to the accompanying drawings. Although the embodiments are described herein in terms of ATM, they are illustrative and not restrictive. The present invention can be applied to any system which monitors and controls the rate of flow of packets into a network that routes each packet in accordance with routing information contained in that packet. For instance, the present invention is applicable to SMDS as well.

Figure 2:
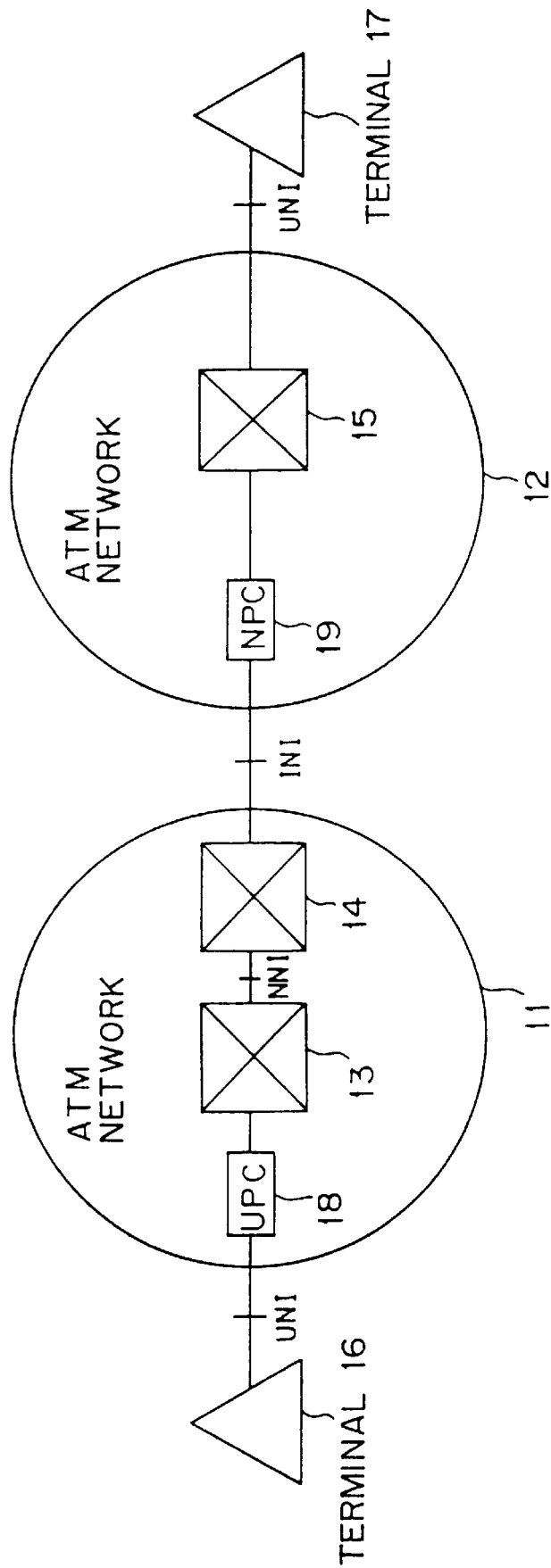
FIG. 2 is a schematic representation of an ATM network which uses a cell flow-rate monitor and control system according to an embodiment of the invention.

FIG. 2 is a schematic representation of an ATM network to which a cell flow rate monitor and control system according to an embodiment of the invention is applied.

An ATM network 11 includes switching units 13 and 14 and accommodates a terminal 16. An ATM network 12 includes switching unit 15 and accommodates a terminal 17. The ATM networks 11 and 12 are implemented by carriers which differ from each other.

To transfer data from the terminal 16 to the terminal 17, the terminal 16 first declares parameters associated with data transfer to establish a connection. The parameters declared here include, for example, a transfer rate and service quality. The ATM networks 11 and 12 make a decision of whether or not a connection can be established in accordance with the declared parameters and, when it can be established, inform the terminal 16 of an identifier VPI/VCI (Virtual Path Identifier/Virtual Channel Identifier) indicating a transmission path between the terminals 16 and 17 and then set various pieces of information associated with that connection in the switching units 13, 14 and 15.

The terminal 16 stores information to be transferred in cells, places the VPI/VCI in the header of each cell, and sends the cells over the ATM network 11. Each cell is autonomously routed through the ATM networks 11 and 12 to the terminal 17.

A UNI (User Network Interface) is established between the terminal 16 and the ATM network 11 (or between the terminal 17 and the ATM network 12) and an INI (Inter Network Interface) is established between the ATM networks 11 and 12.

A UPC (Usage Parameter Control) facility 18 is installed at an input port of the ATM network on the UNI. Also, an NPC (Network Parameter Control) facility 19 is provided at an input port of the ATM network on the INI. The cell flow rate monitor and control system of the invention is implemented by the use of the UPC facility 18 or the NPC facility 19.

Figure 3A:
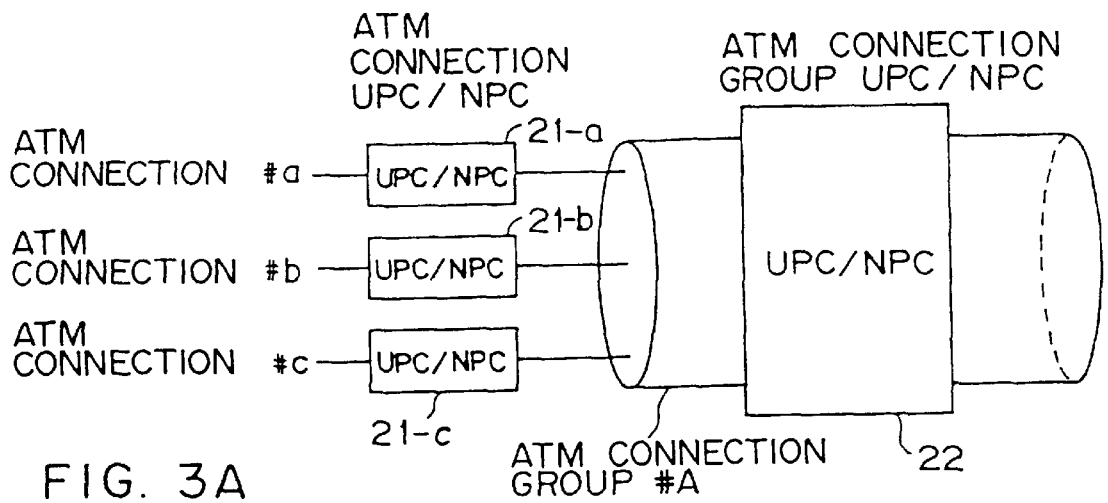
FIG. 3A is a diagram for use in explanation of the concept of the cell flow-rate monitor and control system.

FIG. 3A illustrates the basic configuration of the cell flow rate monitor and control system of the invention.

In ATM, multiple connections can be established in one physical link. In addition, it is also possible to establish multiple connections in one virtual path. Here, a connection is defined as a virtual communication path that is uniquely specified by VPI/VCI. Therefore, for example, a plurality of connections which permit cells to be routed from a certain input line to a certain output line can be established in an ATM switch. In the cell flow rate monitor and control system of the invention, a connection group is defined for a plurality of connections that are established on the same route in the ATM network.

Here, the definition of a connection group will be described. In general, when an attempt is made to establish a connection, information necessary to set up a connection, such as destination information, traffic characteristics, etc., is externally notified to the switching unit. For example, this is performed by a signaling message from a user terminal or a management command from an operator who received a service request. Thus, the use of a CAC (Connection Admission Control) function of the switching unit permits connections bound for the same output to be recognized on the basis of the externally notified information. A connection group is defined as a group of connections that are directed to the same output. It is also possible to define a connection group in minuter details. For example, a plurality of connections that are directed in the same direction may be classified by quality class.

In FIG. 3A, each of ATM connections #a, #b and #c is a virtual communication path that is specified by its specific VPI/VCI and directed to the same output line. These ATM connections belong to an ATM connection group #A. UPC/NPC facilities 21-a, 21-b and 21-c are provided for the ATM connections #a, #b and #c, respectively. A UPC/NPC facility 22 is provided for the ATM connection group #A. The UPC/NPC facility means the UPC facility or NPC facility. When the cell flow rate monitor and control system of the invention is installed in the UNI, the UPC/NPC facility acts as the UPC facility, while the system is installed in the INI, the UPC/NPC facility acts as the NPC facility.

Figure 3B:
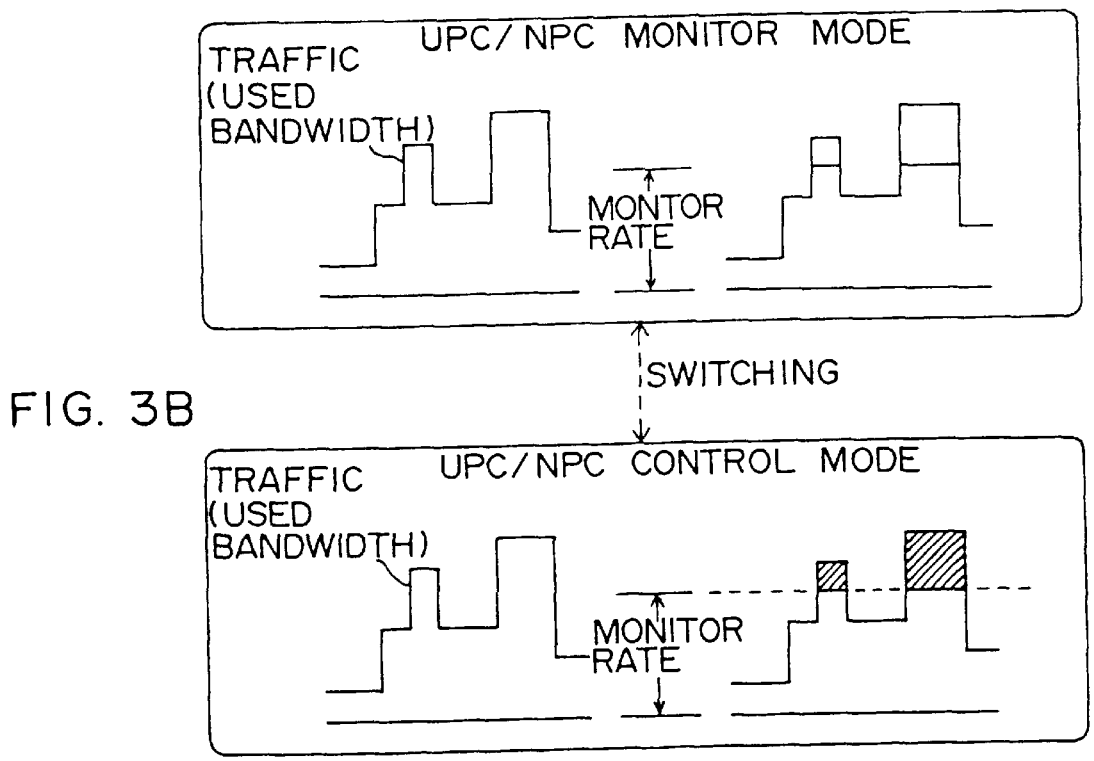
FIG. 3B is a diagram for use in explanation of the basic operations of UPC/NPC.

FIG. 3B is a diagram illustrating the operation of the UPC/NPC facility. The UPC/NPC facility operates in either the monitor mode or the control mode. Which mode the UPC/NPC facility operates in is set by, for example, a call processor (call control processor) for controlling the switching units.

In the monitor mode, each UPC/NPC facility monitors whether the actual cell transfer rate exceeds a monitor rate. As the monitor rate, use may be made of a parameter declared when a connection is established. In the following description, "cell transfer rate" and "cell flow rate" may be used in the same sense.

Each UPC/NPC facility monitors the transfer rate by means of a leaky bucket technique by way of example. The leaky bucket technique, which will be described later in detail, will be mentioned here briefly. In the leaky bucket technique, a transfer rate and the like are set as monitor parameters. Defining a transfer rate is identical to defining cell intervals. When the time interval at which cells arrive at the UPC/NPC facility is shorter than the interval between cells corresponding to the transfer rate set as the monitor parameter, incoming cells are regarded as nonconforming cells. When the frequency of occurrence of such nonconforming cells is a specific value or more (e.g., N times or more per second), it is decided that the transfer rate in the connection or connection group exceeds the monitor rate.

In the monitor mode, the UPC/NPC facility 21-a monitors whether the transfer rate of cells transferred over the ATM connection #a exceeds the monitor rate set for that connection. The UPC/NPC facilities 21-b and 21-c perform the same monitoring operation on the ATM connections #b and #c, respectively. Here, the monitor rate may be set for each UPC/NPC (for each connection) independently. The UPC/NPC facility 22 monitors whether the transfer rate of all cells transferred over the ATM connections #a, #b and #c exceeds the sum of the transfer rates respectively set for the ATM connections #a, #b and #c. As an example, suppose that transfer rates of 3 Mbps, 1 Mbps and 1 Mbps are respectively set for the ATM connections #a, #b and #c. Then, the UPC/NPC facility 22 monitors whether the sum of the transfer rates of cells transferred over the ATM connections #a, #b and #c exceeds 5 Mbps. In the monitor mode, even when nonconformity (exceeding the monitor rate) is detected in a certain connection or connection group, cells that are transferred over that connection or connection group are entered into the ATM network as they are.

In the control mode, on the other hand, the UPC/NPC facility performs the same monitoring operation as in the monitor mode and performs a process of discarding cells that are transferred over a connection for which nonconformity is detected or setting the priority of those cells low. When the leaky bucket control is performed in the control mode, the nonconforming cells are discarded or their priority is set low.

When the transfer rate of cells that are transferred over the ATM connection #a exceeds the monitor rate set for that ATM connection, the UPC/NPC facility 21-a discards cells that exceeds its monitor rate or sets the priority of those cells low. In FIG. 3B, cells in the portions indicated by oblique lines are discarded or their priority is decreased. Which of the discarding and the priority control is to be performed is determined in advance. The UPC/NPC facilities 21-b and 21-c perform the same control on the ATM connections #b and #c, respectively. When the transfer rate of all of cells that are transferred over the ATM connections #a, #b and #c exceeds the sum of the monitor rates set for the ATM connections, the UPC/NPC facility 22 discards cells that exceed the sum of the monitor rates or decreases their priority.

Possible ways to decrease the priority of cells are the following two. One way is to use the CLP (Cell Loss Priority) bit in the header of each cell. That is, high-priority cells have their CLP bit set to zero, while low-priority cells (non-priority cells) have their CLP bit set to one. The other way is to write information indicating priority into a tag attached to each cell in the switching unit. The process of setting the CLP bit to one or the process of writing information indicating non-priority cell into a tag shall be called "tagging" (or "marking"). The "tagging" means attaching a tag.

Next, various modes of the cell flow rate monitor and control system of the invention will be described.

Figure 4:
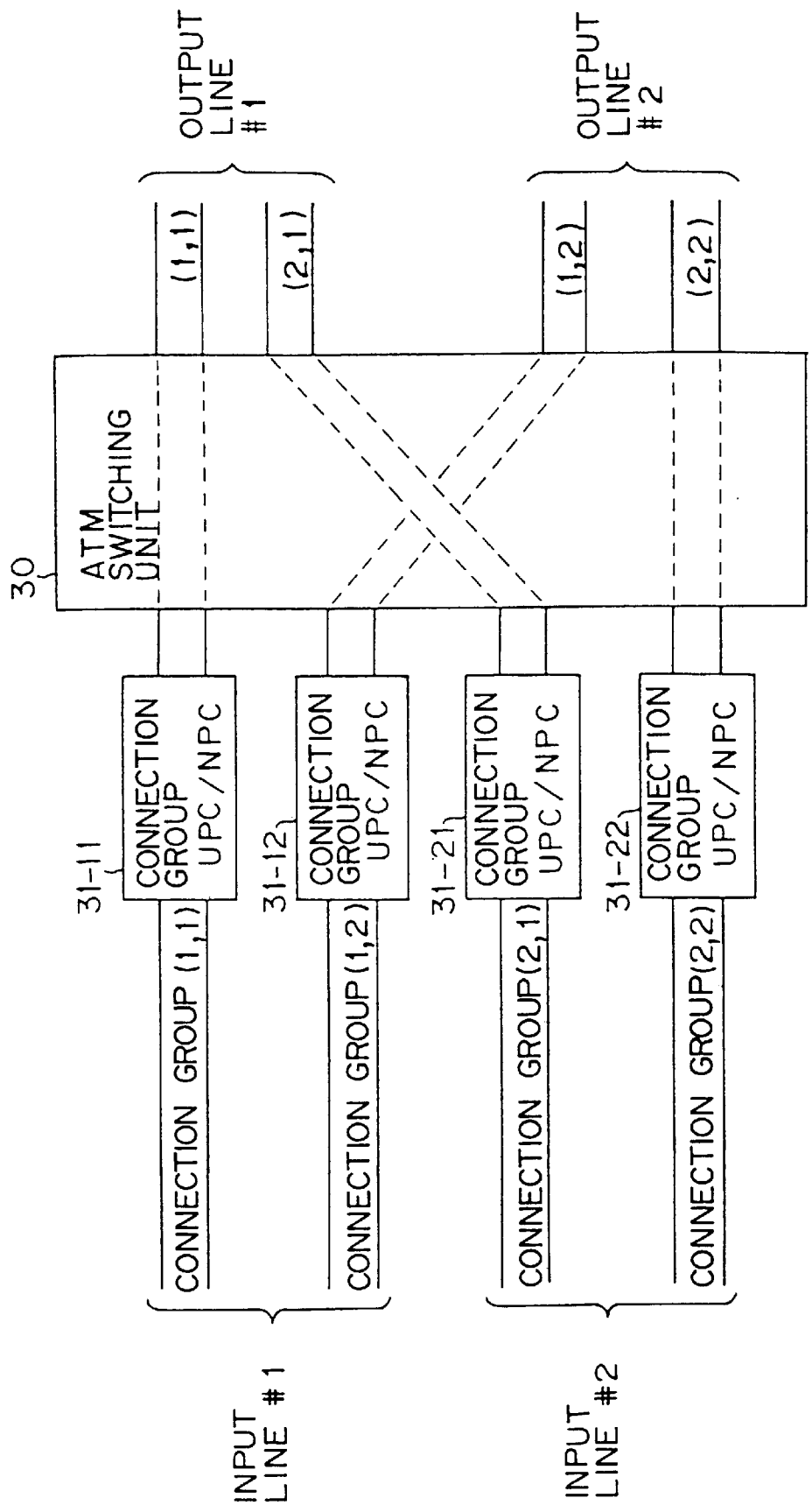
FIG. 4 is a diagram for use in explanation of various modes of the cell flow-rate monitor and control system.
Figure 5:
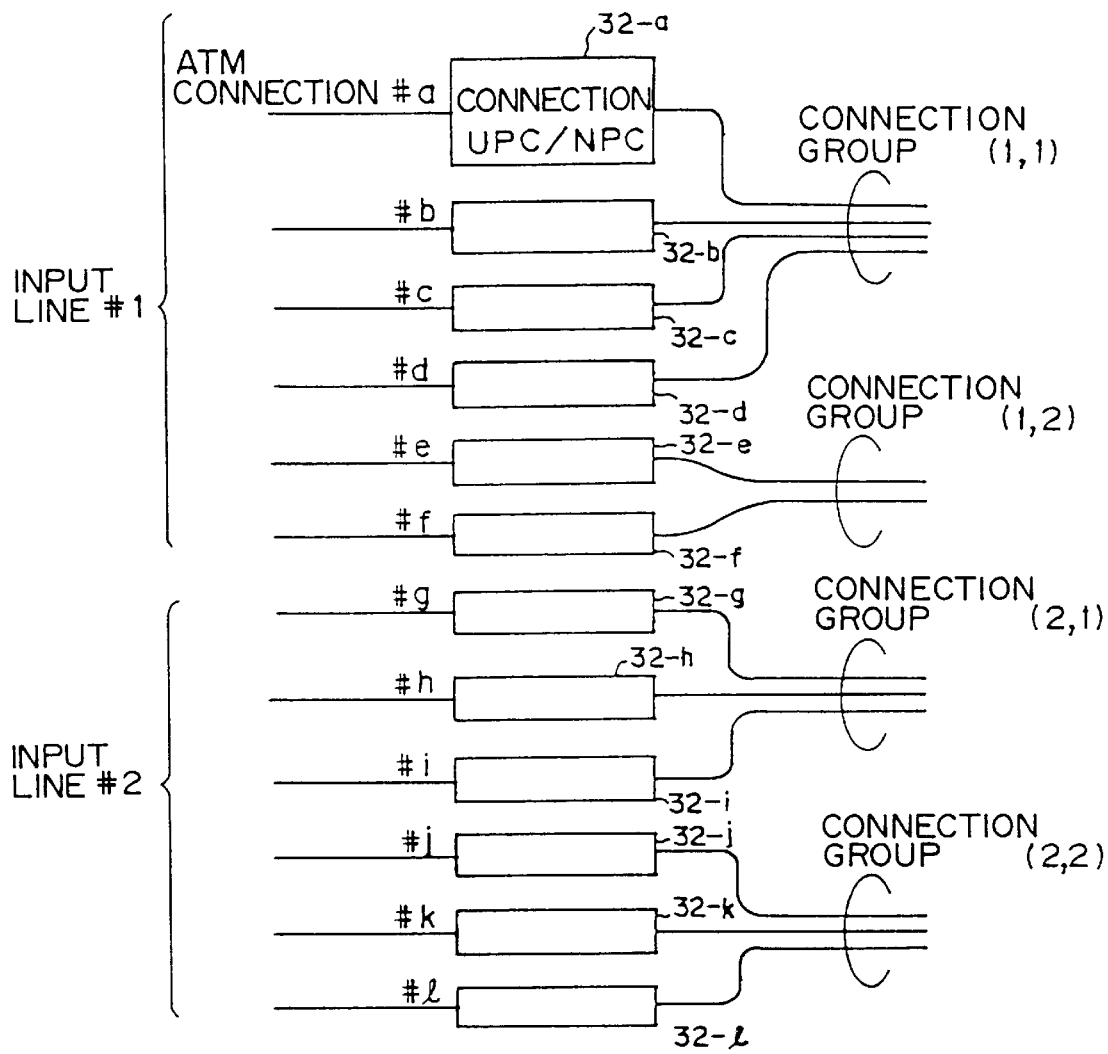
FIG. 5 is a diagram for use in explanation of various modes of the cell flow-rate monitor and control system.

FIGS. 4 and 5 are diagrams used to explain various modes of the cell flow rate monitor and control system. As an example, a switching unit 30 to which two input lines (#1, #2) and two output lines (#1, #2) are connected as shown in FIG. 4 will be described here for simplicity. The input and output lines may be either physical links or virtual paths. A group of connections that is connected from the input line #1 to the output line #1 is defined as a connection group (1, 1). In the same manner, connection groups (1, 2), (2, 1) and (2, 2) are defined. Connection group UPC/NPC facilities 31-11, 31-12, 31-21 and 31-22 (hereinafter referred to simply as UPC/NPCs 31-11, 31-12, 31-21, 31-22) are provided for the respective connection groups.

As shown in FIG. 5, the connection group (1, 1) is composed of connections #a, #b, #c and #d, the connection group (1, 2) is composed of connections #e and #f, and the connection group (2, 1) is composed of connections #g, #h and #i. And the connection group (2, 2) is composed of connections #j, #k and #l. In this case, the connections #a to #d are all directed from the input line #1 to the output line #1. Connection UPC/NPC facilities 32-a to 32-l (hereinafter referred to simply as UPC/NPCs 32-a to 32-l) are provided for the respective connections.

Although, in FIG. 4, the UPC/NPCs 31-11, 31-12, 31-21 and 31-22 are each shown by an independent block and, in FIG. 5, the UPC/NPCs 32-a to 32-l are each shown by an independent block, they are merely shown separated functionally. These functional blocks are implemented in hardware, for example, by the use of a single device which receives cells transferred over the connections, identifies the connections (or the connection groups) by VPI/VCI in each cell, and carries out the flow rate monitor and control operation for each connection (or each connection group).

In FIGS. 6 to 16, the UPC/NPCs 31-11, 31-12, 31-21 and 31-22 or the UPC/NPCs 32-a to 32-l are not shown but only their function is shown.

Figure 6:
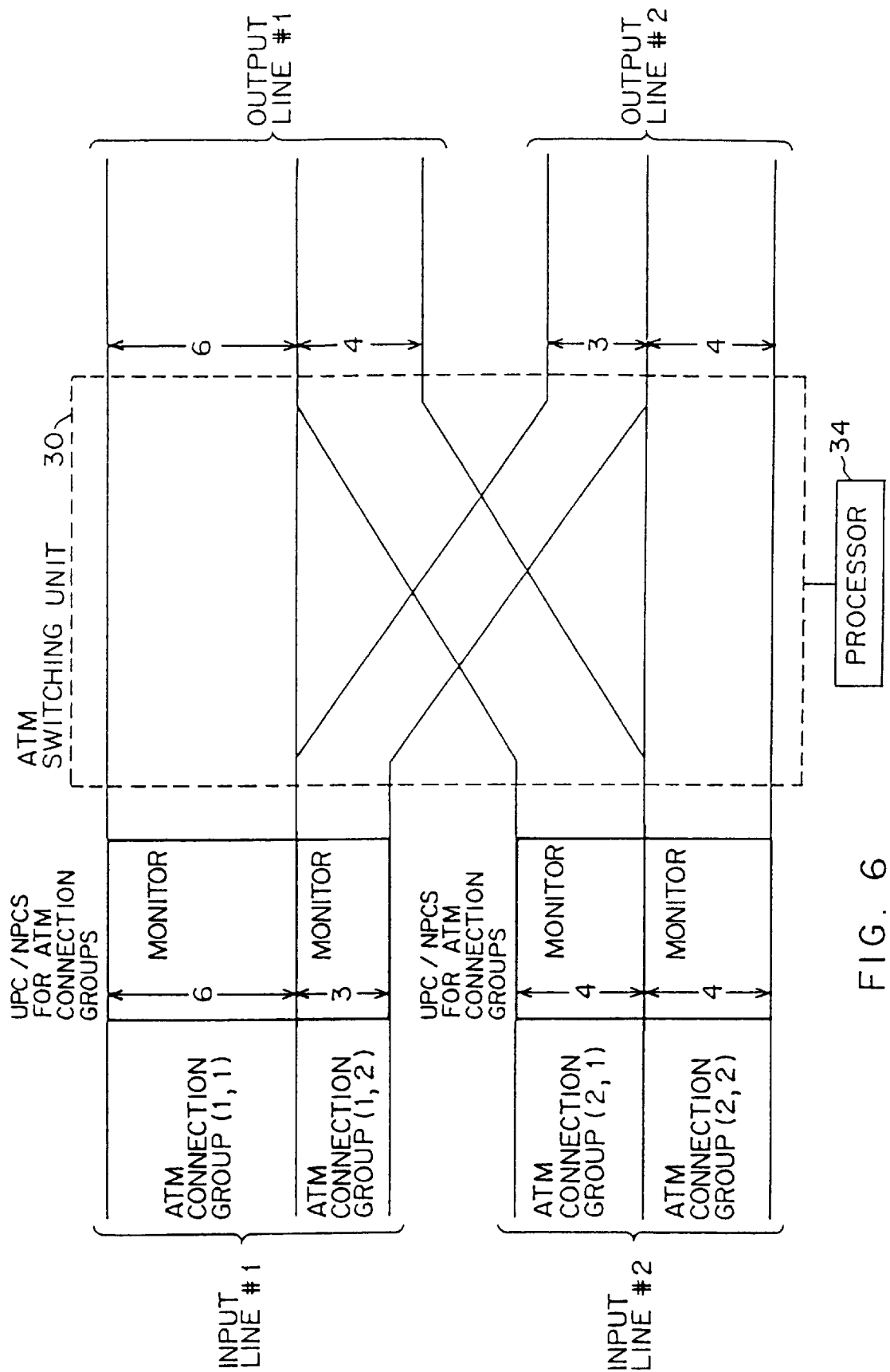
FIG. 6 is a diagram for use in explanation of a first mode.

FIG. 6 is a diagram explanatory of the concept of a first mode. In this figure, "6" shown on the connection group (1, 1) indicates a monitor rate set in the UPC/NPC 31-11. This monitor rate is determined from transfer rates included in parameters declared when the connections #a to #d composing the connection group (1, 1) are established and selected to be the sum of the transfer rates for the connections. For the other connection groups as well, the monitor rates are determined in the same way. The monitor rates may be set in other ways. For example, they may be set fixed at the time of initialization of the switching unit 30.

The connection groups (1, 1) and (2, 1) are established for the output line #1. Thus, assuming that the monitor rates for the connection groups (1, 1) and (2, 1) are 6 and 4, the assumed rate for the output line #1 will be 10. In other words, when the transfer rate is 10 or below, no congestion occurs and no cell loss occurs.

In the first mode, the UPC/NPCs 31-11, 31-12, 31-21 and 31-22 are operated in the monitor mode. For example, the UPC/NPC 31-11 monitors whether or not the transfer rate in the connection group (1, 1) exceeds the monitor rate "6". When the monitor rate is exceeded, the UPC/NPC notifies a processor 34 controlling the switching unit 30 of it but allows cells to go into the switching unit 30 as they are.

In the first mode, the UPC/NPCs 32-a to 32-l provided for the connections are all operated in the monitor mode or stopped. Alternatively, the UPC/NPCs 32-a to 32-l need not be provided. This applies to second to fifth modes to be described later.

In the first mode, assume that the actual transfer rate in the connection group (2, 1) is 2. Then, since the assumed rate for the output line #1 is 10, the first mode allows the connection group (1, 1) to transfer cells at a transfer rate of up to 8 on the output line #1. That is, when the sum of the transfer rates in the connection groups (1, 1) and (2, 1) is lower than the assumed rate for the output line #1, cells will not be discarded in the output line #1. Here, "cells are discarded in the output line #1" supposes, for example, that a buffer provided for each of the output lines of the ATM switching unit overflows.

When, as described above, the transfer rate in the connection group (1, 1) is made higher than the monitor rate set for the connection group, the UPC/NPC 31-11 notifies the processor 34 controlling the switching unit 30 of it but allows cells to pass through as they are. That is, cells are not discarded in the UPC/NPC 31-11.

Thus, if the UPC/NPCs 31-11, 31-12, 31-21 and 31-22 are caused to operate in the monitor mode, the transfer of cells can be made at a transfer rate higher than the monitor rate by using the bandwidth of a low-usage connection group. At this point, it is not required to make the capacity of an input or output line greater, permitting effective utilization of resources of the ATM switching unit.

Figure 7:
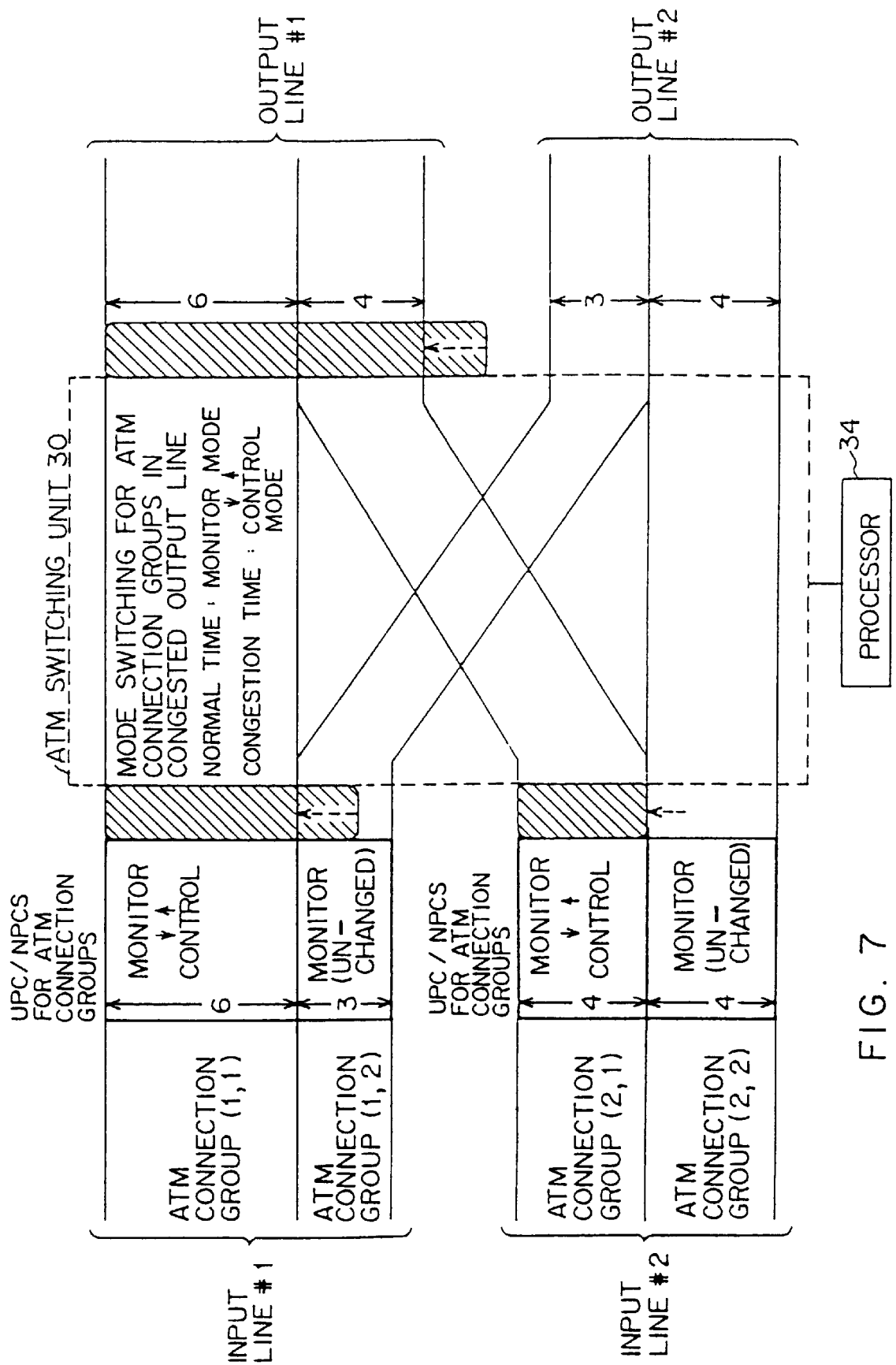
FIG. 7 is a diagram for use in explanation of a second mode.

FIG. 7 illustrates the concept of a second mode. As with the first mode, in the second mode, the UPC/NPCs 31-11, 31-12, 31-21 and 31-22 are operated in the monitor mode. In the second mode, however, each output line is monitored for congestion and, when a certain output line is congested, the UPC/NPCs corresponding to that output line are switched into the control mode.

For example, when the output line #1 becomes congested, connection groups that have been established on the output line #1 are extracted. That is, the connection groups (1, 1) and (2, 1) are extracted. The UPC/NPCs 31-11 and 31-21 corresponding to the connection groups (1, 1) and (2, 1) are then switched into the control mode. A method of detecting congestion in output lines will be described later. When the output line #1 is recovered from the congestion, the UPC/NPCs 31-11 and 31-21 are returned to the monitor mode. An instruction to switch each UPC/NPC between the modes of operation is issued by the processor 34 controlling the switching unit 30.

When the output line #1 becomes congested and the UPC/NPCs 31-11 and 31-21 are operated in the control mode as described above, nonconforming cells that are transferred over the connection groups (1, 1) and (2, 1) are discarded. Thus, the rate of flow of cells in each connection directed to the output line #1 becomes lower than the corresponding monitor rate, allowing the output line #1 to be recovered quickly from the congestion to the normal state. When the UPC/NPCs 31-11 and 31-21 performs a tagging process instead of the discarding process, the nonconforming cells may be discarded in the switching unit 30, which likewise allows the output line #1 to be recovered from the congestion to the normal state.

Figure 8:
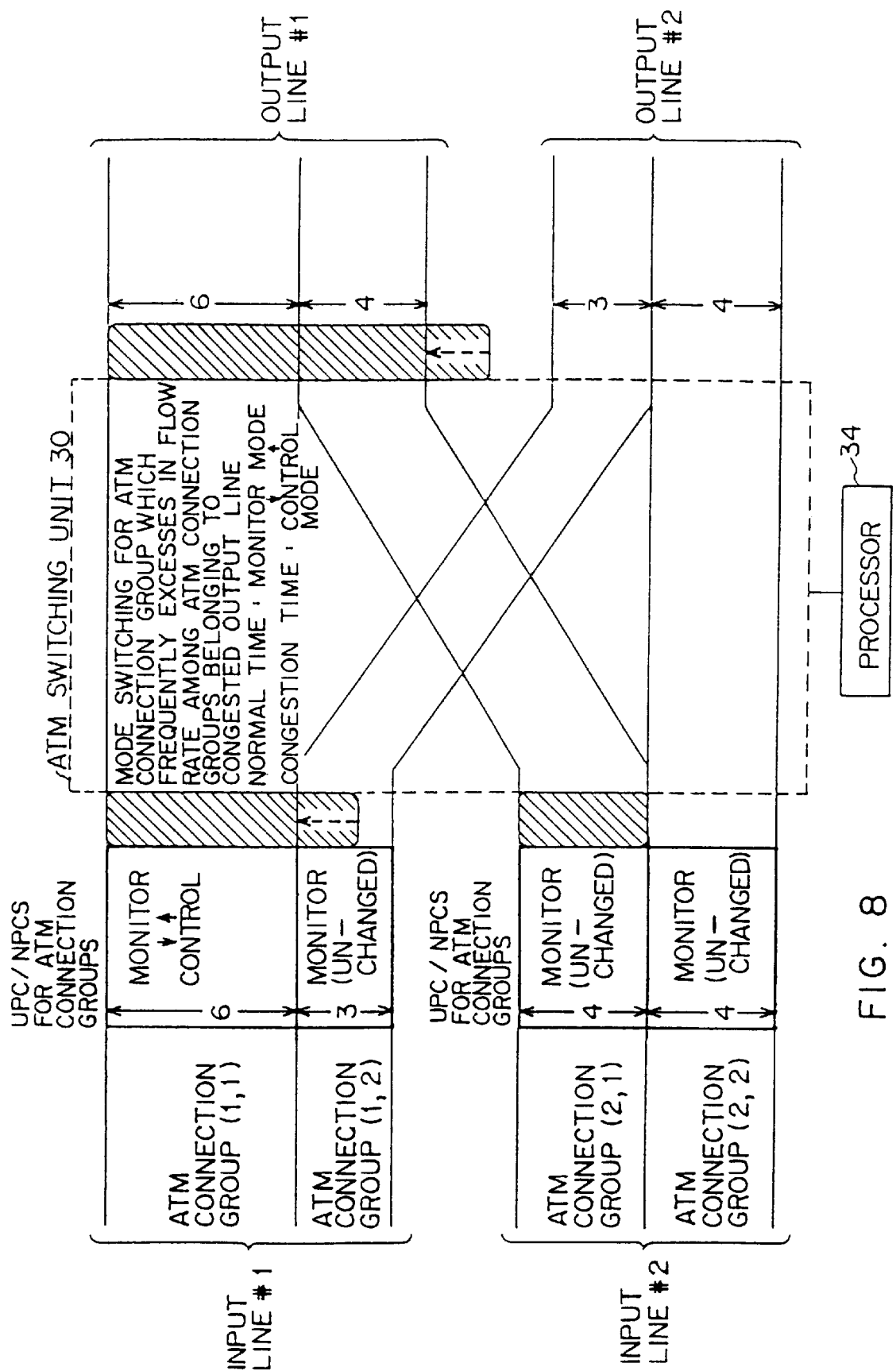
FIG. 8 is a diagram for use in explanation of a third mode.

FIG. 8 illustrates the concept of a third mode. As with the second mode, in this mode, the UPC/NPCs 31-11, 31-12, 31-21 and 31-22 are operated in the monitor mode. In the third mode, each output line is monitored for congestion. When a certain output line becomes congested, a connection group is detected which is presumed to be the cause of congestion. And the operation mode of the UPC/NPC corresponding to that connection group which is presumed to be the cause of congestion is switched from the monitor mode to the control mode.

For example, when congestion occurs in the output line #1, the connection groups (1, 1) and (2, 1) are extracted as connection groups that have been established on the output line #1. Next, reference is made to the results of monitoring by the UPC/NPCs 31-11 and 31-21 corresponding to the connection groups (1, 1) and (2, 1) to extract a connection group with a transfer rate in excess of the monitor rate. In the example of FIG. 8, it is in the connection group (1, 1) that the transfer rate of cells is higher than the monitor rate. In this case, the operation mode of the UPC/NPC 31-11 corresponding to the connection group (1, 1) is switched from the monitor mode to the control mode.

In the control mode, each UPC/NPC detects nonconforming cells by the leaky bucket technique by way of example. In the monitor mode, each UPC/NPC causes nonconforming cells to go into the switching unit 30 without discarding them but constantly calculates the frequency of the nonconforming cells. When the frequency is larger than a predetermined value, the transfer rate is considered to have exceeded the monitor rate.

As described above, by switching the operation mode of the UPC/NPC 31-11 corresponding to the connection group which is the cause of the congestion in the output line #1 to the control mode, the transfer rate of cells that are transferred over the connection group (1, 1) is suppressed to the monitor rate or below, permitting the rate of flow of cells in the output line #1 to approximate to the value assumed in advance. As a result, the output line #1 can be recovered from the congestion to the normal state.

Figure 9:
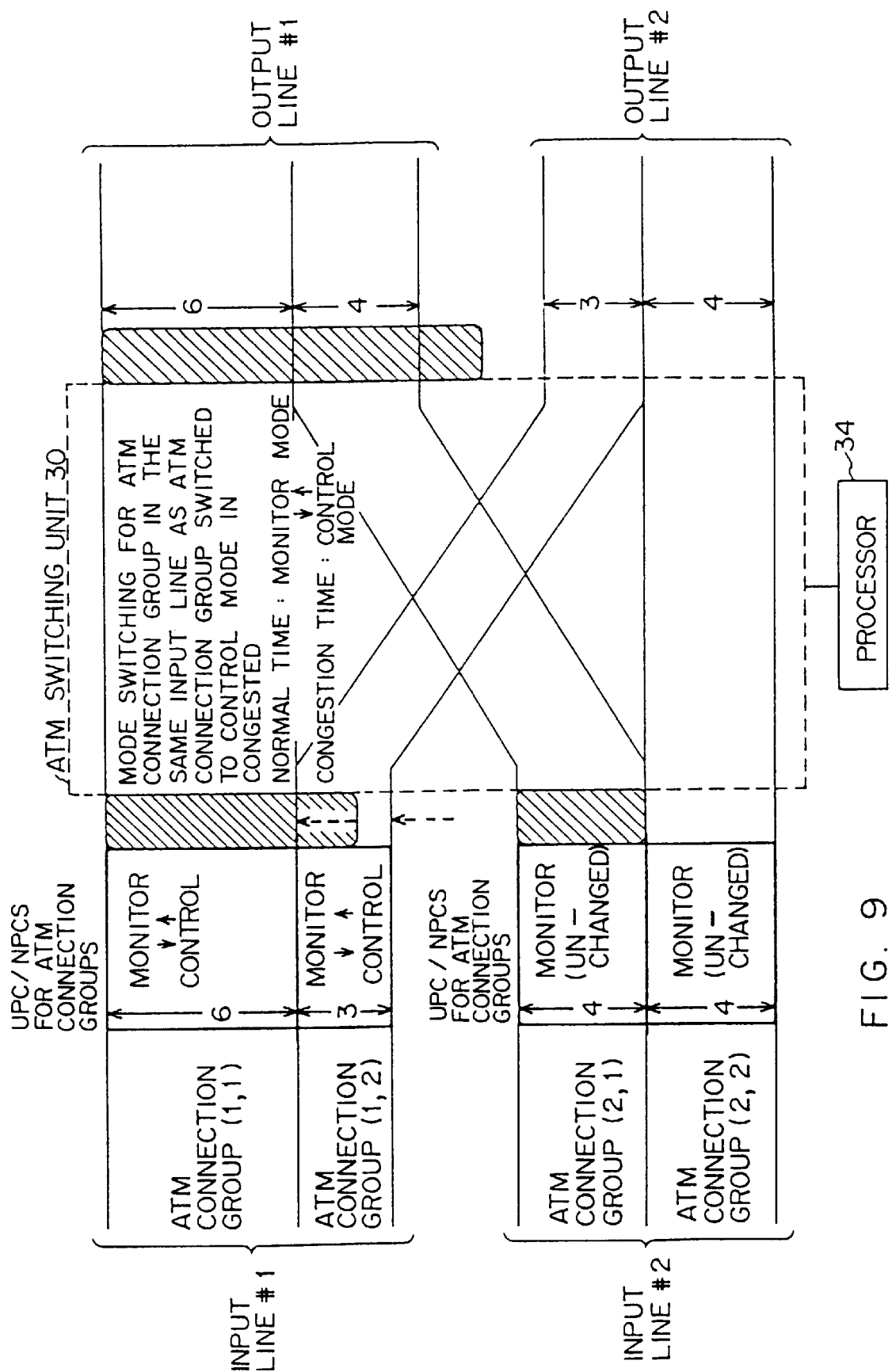
FIG. 9 is a diagram for use in explanation of a fourth mode.

FIG. 9 illustrates the concept of a fourth mode. In comparison with the third mode, the fourth mode has the following additional function. That is, when a specific UPC/NPC is switched from the monitor mode to the control mode as a result of an output line becoming congested, all of UPC/NPCs for connection groups composing an input line for which the connection group controlled by that UPC/NPC is defined are operated in the control mode.

Here, like the example of FIG. 8, description is made of the case where the output line #1 becomes congested as a result of the transfer rate in the connection group (1, 1) exceeding the monitor rate and consequently the UPC/NPC 31-11 corresponding to the connection group (1, 1) is switched from the monitor mode to the control mode. Here, the connection group (1, 1) is established on the input line #1. Thus, each UPC/NPC corresponding to a respective one of the connection groups that are established on the input line #1 are caused to operate in the control mode. That is, the UPC/NPC 31-12 for the connection group (1, 2) is caused to operate in the control mode.

According to such switching control as described above, the mode switching can be made for each input line, thus simplifying the processing.

Figure 10:
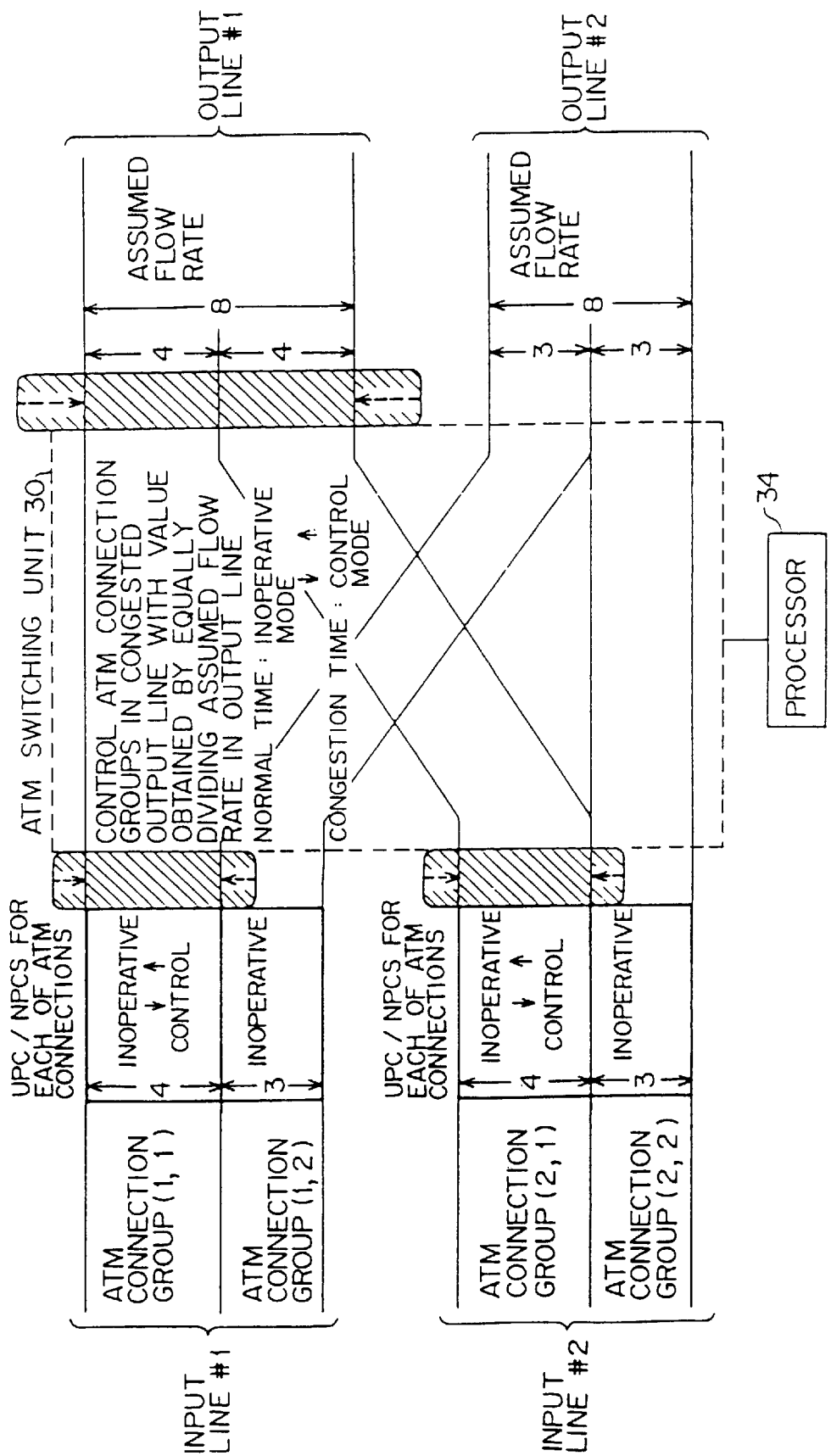
FIG. 10 is a diagram for use in explanation of a fifth mode.

FIG. 10 illustrates the concept of a fifth mode. In this mode, when no congestion occurs in any output line, each UPC/NPC corresponding to a respective one of the connection groups is placed in the inoperative state. That is, the monitor operation of each UPC/NPC is stopped. Alternatively, the processor 34 for controlling the switching unit 30 may ignore the results of monitoring by each UPC/NPC.

In addition, in the fifth mode, an assumed rate of flow is set for each output line. This setting may be determined on a fixed basis or may be updated each time a connection is established. In the example of FIG. 10, the assumed rate of flow for the output line #1 is set to 8. The assumed rate of flow for the output line #1 is set such that, if the transfer rate of cells transferred over the connection groups (1, 1) and (2, 1) is below the assumed rate, then cells will not be discarded in the output line #1. When congestion occurs in an output line, UPC/NPCs for connection groups established on that output line are caused to operate in the control mode and their monitor rate is set to a value obtained by dividing the assumed rate of flow by the number of the connection groups.

For example, when the output line #1 becomes congested, the UPC/NPCs 31-11 and 31-21 for the two connection groups (1, 1) and (2, 1) established on the output line #1 are operated in the control mode. At this point, the monitor rates used in the UPC/NPCs 31-11 and 31-21 are each set to 4, the value obtained by dividing the assumed rate of flow in the outgoing line #1, i.e., 8, by the number of the connection groups, i.e., 2. The UPC/NPCs 31-11 and 31-21 respectively monitor the transfer rate of cells in the connection groups (1, 1) and (2, 1) and discard cells the flow rate of which exceeds the monitor rate 4.

Thus, according to the fifth mode, there is no need of setting a monitor rate for each connection group. The rate of flow of cells can be regulated simply by setting an assumed rate of flow for an output line. In addition, at the time of occurrence of congestion in an output line, it is possible to allow each connection group to transfer cells equally.

Figure 11:
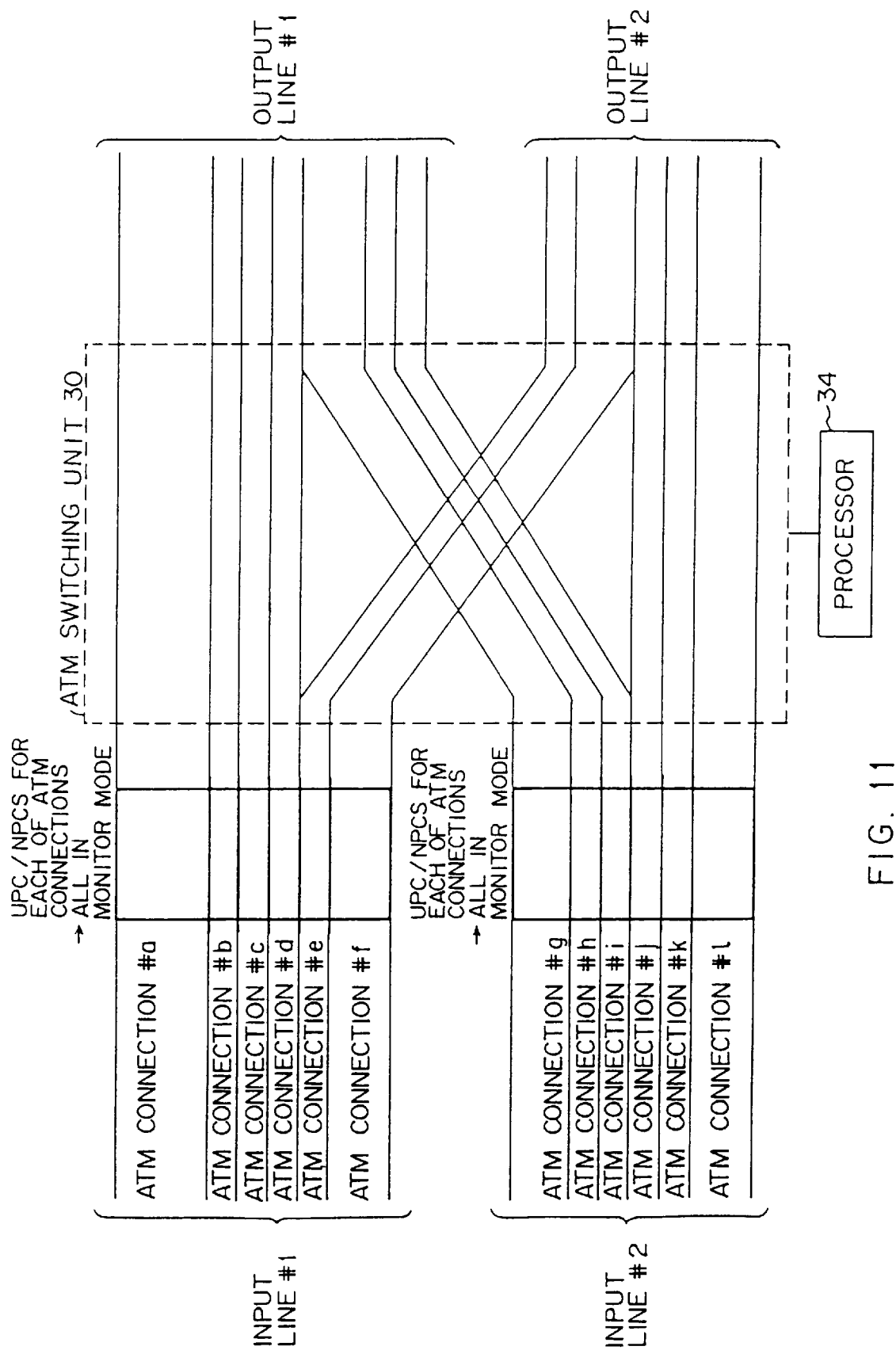
FIG. 11 is a diagram for use in explanation of a sixth mode.

FIG. 11 illustrates the concept of a sixth mode. In this mode, the operation described in connection with the first mode is performed for each connection. That is, the UPC/NPCs 32-a to 32-l respectively corresponding to the connections #a to #l are all operated in the monitor mode.

In the sixth mode, the UPC/NPCs for the connection groups are made inoperative or operated in the monitor mode. Alternatively, the UPC/NPCs for monitoring the connection groups need not be provided. The same applies to seventh and eighth modes.

The connections #a to #d and #g to #i are established on the output line #1. For example, if the connections #b to #d and #g to #i are of low usage, then the connection #a is allowed to transfer cells at a rate equal to or higher than the monitor rate set for the connection #a. That is, by placing the UPC/NPCs in the monitor mode, the unused bandwidths of the other connections can be utilized to transfer cells at a rate equal to or higher than the monitor rate. At this point, the UPC/NPC 32-a recognizes that the transfer rate in the connection #a has exceeded the monitor rate and notifies the processor 34 of it.

Figure 12:
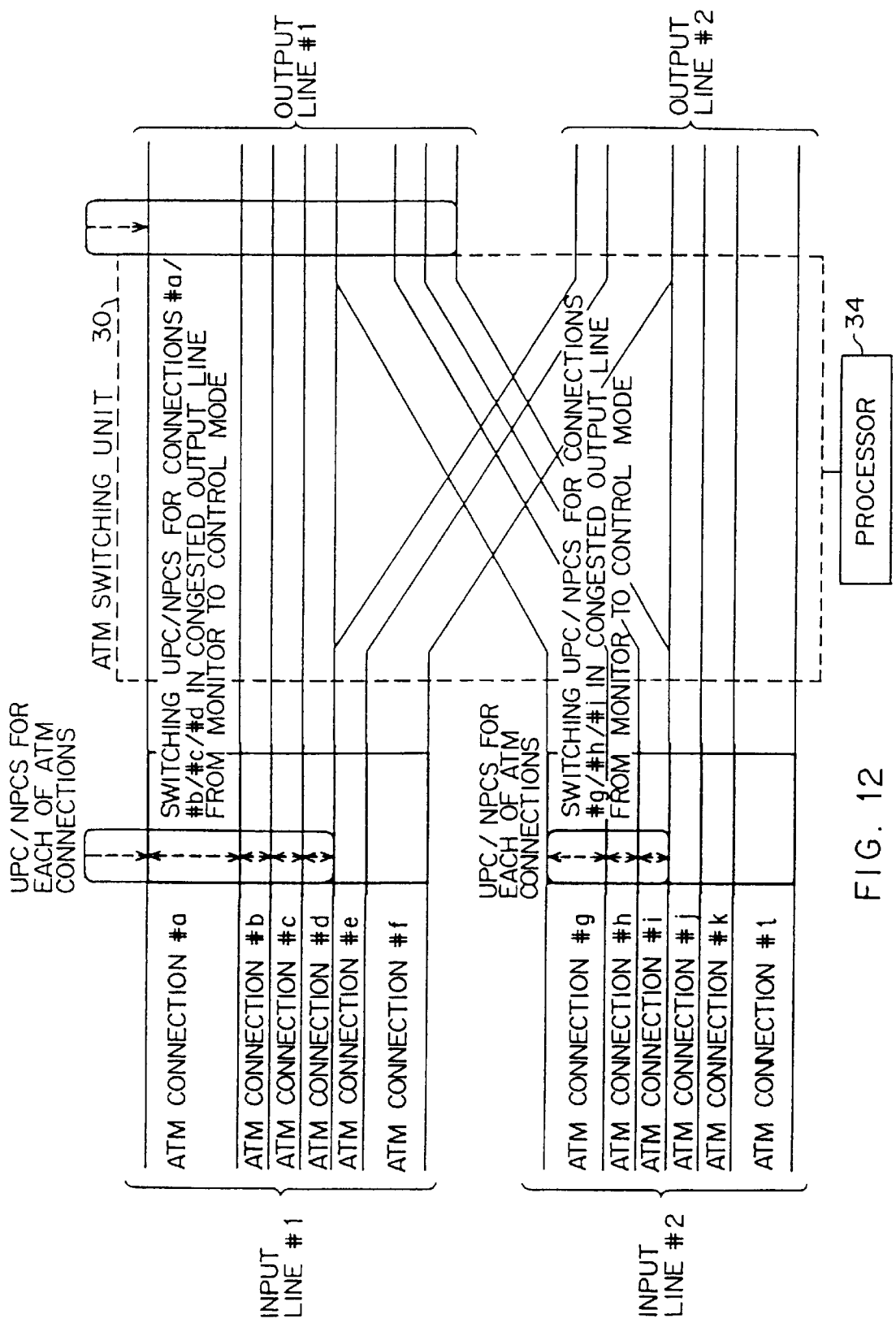
FIG. 12 is a diagram for use in explanation of a seventh mode.

FIG. 12 illustrates the concept of a seventh mode. In this mode, basically the operation described in connection with the second mode is performed for each connection. That is, the UPC/NPCs 32-a to 32-l, each provided for a respective one of the connections, are operated in the monitor mode to monitor the respective individual connections for congestion. When congestion occurs in an output line, the UPC/NPC corresponding to that output line is switched to the control mode.

For example, when the output line #1 is congested, connections established on the output line #1 are extracted. That is, the connections #a to #d and #g to #i are extracted. And the UPC/NPCs 32-a to 32-d and 32-g to 32-i corresponding to the connections #a to #d and #g to #i are operated switched from the monitor mode to the control mode. When the output line #1 is recovered from the congestion to the normal state, the UPC/NPCs 32-a to 32-d and 32-g to 32-i are returned from the control mode to the monitor mode.

Figure 13:
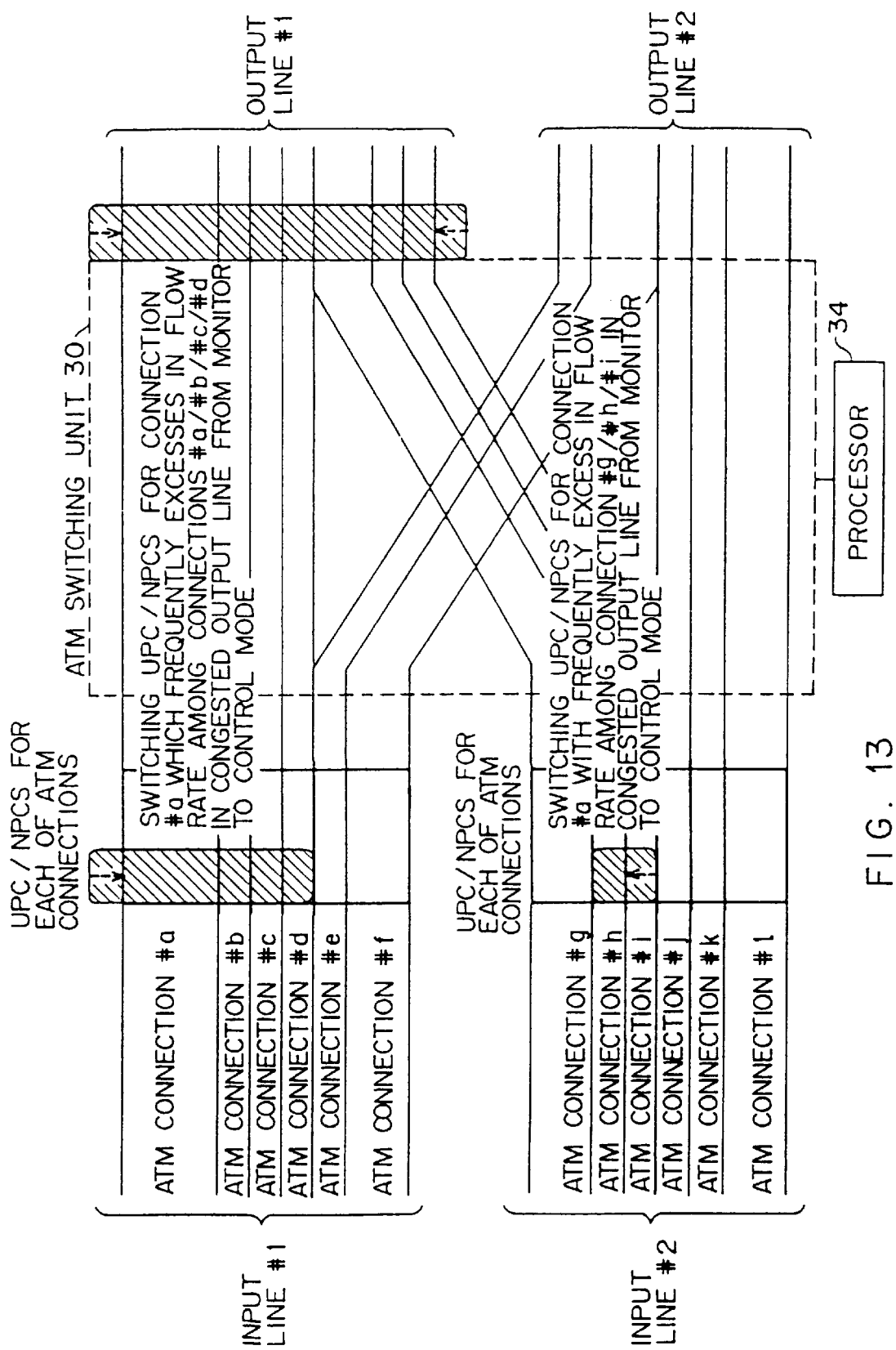
FIG. 13 is a diagram for use in explanation of an eighth mode.

FIG. 13 illustrates the concept of an eighth mode. In this mode, basically the operation described in connection with the third mode is performed for each connection. That is, the UPC/NPCs 32-a to 32-l, each provided for a respective one of the connections, are operated in the monitor mode to monitor the respective individual connections for congestion. When congestion occurs in an output line, a connection that is presumed to be the cause of the congestion is detected. The UPC/NPC corresponding to the detected connection is switched from the monitor mode to the control mode.

When the output line #1 is congested, the connections #a to #d and #g to #i established on that output line are extracted. Next, reference is made to the results of monitoring by the UPC/NPCs 32-a to 32-d and 32-g to 32-i to extract a connection or connections for which the transfer rate is exceeding the monitor rate set for each connection (UPC/NPC). In the example of FIG. 13, the transfer rates in the connections #a and #i exceed the monitor rates. As a result, the UPC/NPCs 32-a and 32-i respectively provided for the connections #a and #i are operated switched from the monitor mode to the control mode.

Although it is also possible to perform the operations described in connection with the fourth and fifth modes for each connection, their illustration is omitted.

Figure 14:
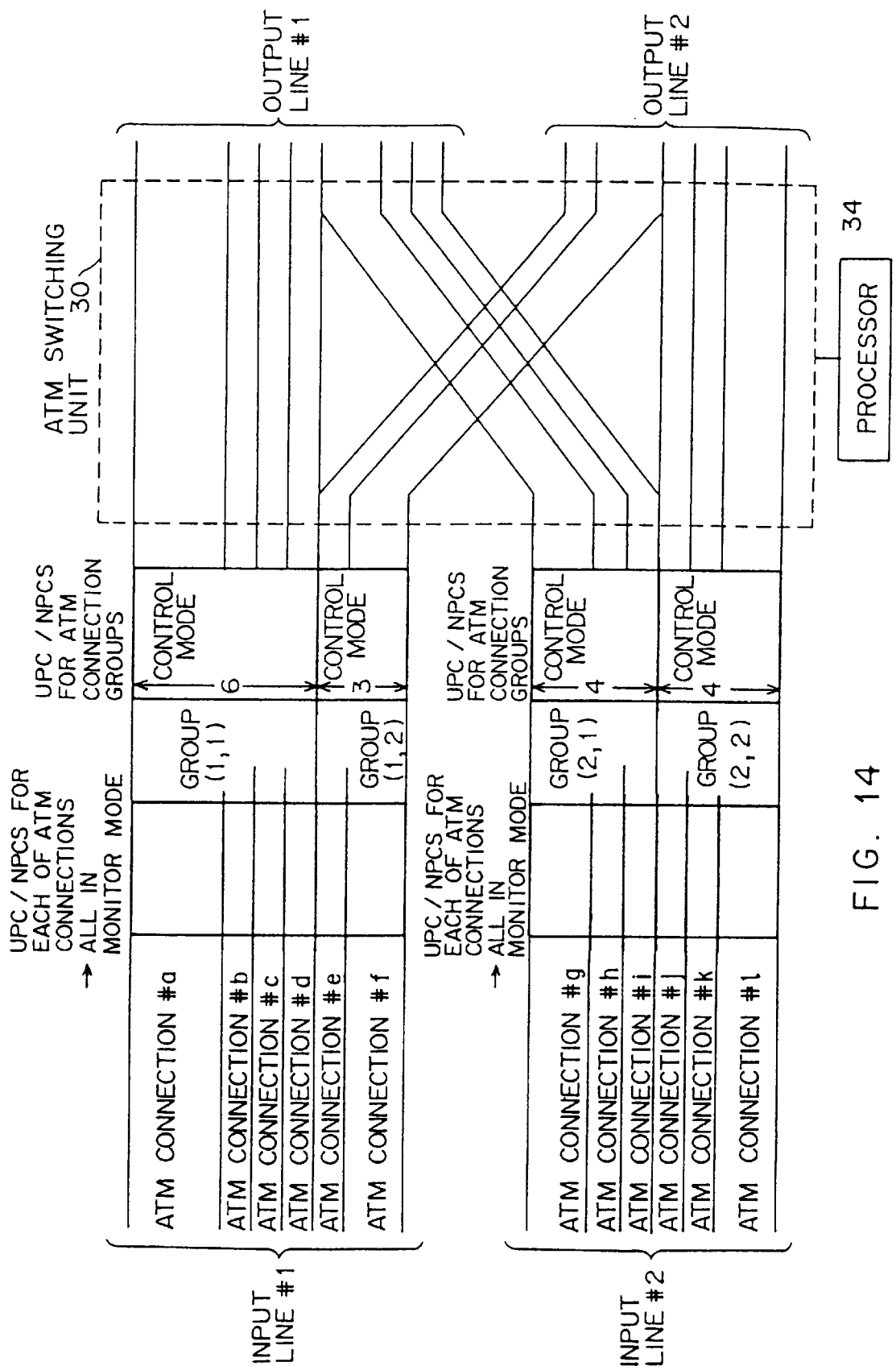
FIG. 14 is a diagram for use in explanation of a ninth mode.

FIG. 14 illustrates the concept of a ninth mode. In this mode, the UPC/NPCs each provided for a respective one of the connection groups and the UPC/NPCs each provided for a respective one of the connections are used together. And the UPC/NPCs 32-a to 32-l for the connections are operated in the monitor mode, while the UPC/NPCs 31-11, 31-12, 31-21 and 31-22 for the connection groups are operated in the control mode.

In the ninth mode, when the transfer rate in a connection group exceeds the monitor rate, nonconforming cells are discarded, thus regulating the transfer rate in each connection group by the monitor rate for it. This prevents the ATM switching unit 30 and each output line from becoming congested.

In the ninth mode, for each connection the mode of operation is the monitor mode. For this reason, if, when it is desired to transfer cells in large quantities over a connection, the usage rate of another connection is low, the unused bandwidth of that low-usage connection can be utilized to transfer cells. The required condition in this case is that the transfer rate in the corresponding connection group does not exceed the monitor rate defined for that connection group. In other words, it becomes possible to suitably allocate the bandwidth assigned to one connection group to the connections belonging to it.

Figure 15:
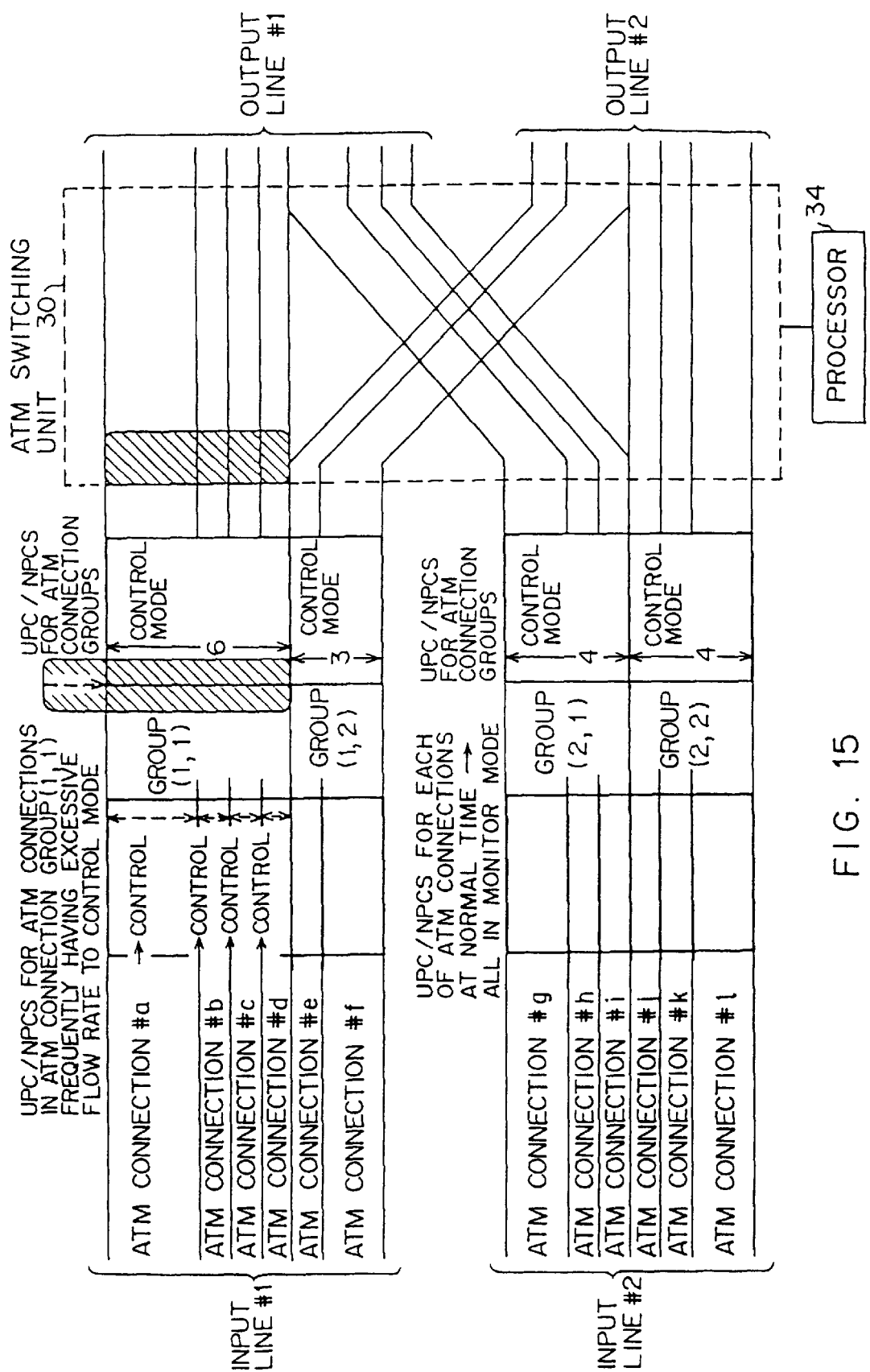
FIG. 15 is a diagram for use in explanation of a tenth mode.

FIG. 15 illustrates the concept of a tenth mode. As with the ninth mode, in the tenth mode, the UPC/NPCs 32-a to 32-l each provided for a respective one of the connections are operated in the monitor mode, while the UPC/NPCs 31-11, 31-12, 31-21 and 31-22 are operated in the control mode. When the transfer rate in one connection group exceeds the monitor rate, the UPC/NPCs provided for all the connections in that connection group are switched to the control mode.

For example, when the transfer rate in the connection group (1, 1) exceeds the monitor rate, the UPC/NPCs 32-a to 32-d for the connections #a to #d in that connection group are operated in the control mode.

Thus, if the transfer rate in a connection group exceeds the monitor rate, the rate of flow is controlled on a connection-by-connection basis, preventing indiscriminate cell discarding involving no consideration of the usage of each connection. That is, since cells are discarded only in a connection or connections in which the rate of flow of cells is in excess, proper control can be performed.

Figure 16:
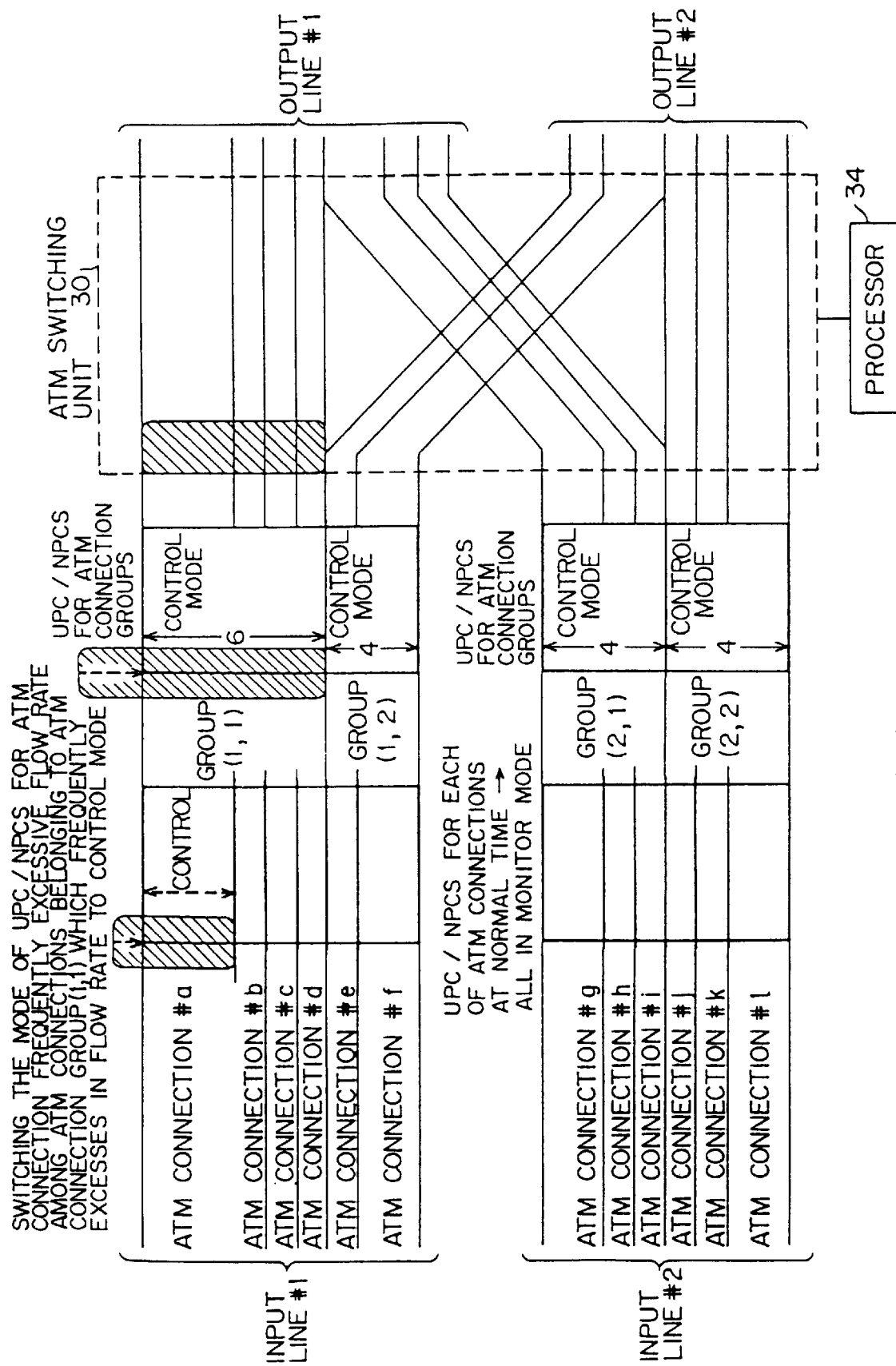
FIG. 16 is a diagram for use in explanation of an eleventh mode.

FIG. 16 illustrates the concept of an eleventh mode. In this mode, the UPC/NPCs 32-a to 32-l for the connections are operated in the monitor mode, while the UPC/NPCs 31-11, 31-12, 31-21 and 31-22 are operated in the control mode. When the transfer rate in one connection group exceeds the monitor rate, a connection in which the transfer rate exceeds the monitor rate is detected from among the connections in that connection group and the UPC/NPC corresponding to the detected connection is switched to the control mode.

For example, when the transfer rate in the connection group (1, 1) exceeds the monitor rate, reference is made to the results of monitoring by the UPC/NPCs 32-a to 32-d provided for the connections #a to #d in the connection group (1, 1). When it is recognized that the transfer rate in the connection #a exceeds the monitor rate as shown in FIG. 16, the UPC/NPC 32-a is switched to the control mode.

As with the tenth mode, in the eleventh mode, cells are discarded only in a connection in which the cell flow rate is in excess, allowing proper control.

Figure 17:
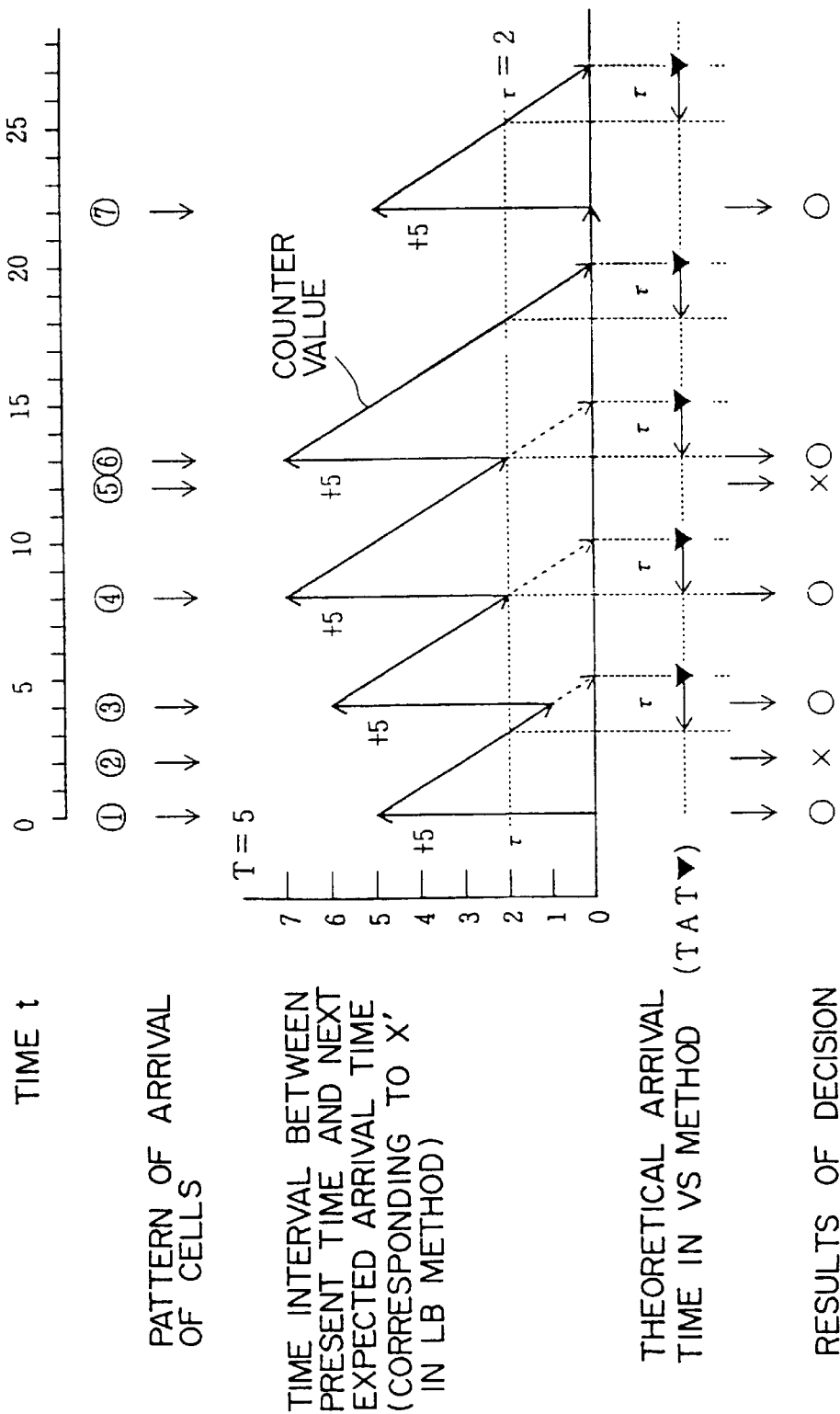
FIG. 17 is a diagram for use in explanation of the operation of a leaky bucket system.

Next, description will be made of the monitor and control operation based on a leaky bucket technique carried out by each UPC/NPC. FIG. 17 is a diagram for use in explanation of the leaky bucket technique.

In the leaky-bucket-based monitor and control, an expected value T of the interval between cells and a fluctuation tolerance value $\tau$ are set. These set values are parameters, including a transfer rate, declared when a connection is established. The expected value T of the cell interval and the fluctuation tolerance value $\tau$ are set in units of a cell time interval (called a time slot) determined by a line transmission rate. Here, suppose the following model for the purpose of simplifying the description. That is, when a transfer rate parameter of 30 Mbps is declared to establish a connection on a 150-Mbps line, it is expected that one cell is transferred every five time slots. In this case, the expected value T of the cell interval on the connection is set to 5.

The UPC/NPC has a leaky bucket counter, which is incremented by the expected value T every time a cell arrives and decremented by one with each time slot. Such a counting operation allows a count value in the counter to represent a period of time to wait until the time at which the next cell is expected to arrive. That is, it is expected that the next cell will arrive at the time when the counter in the leaky bucket counter reaches zero.

In FIG. 17, suppose that the initial value of the counter is 0. When, at time t=t0, cell 1 arrives, the count is incremented by the expected value T of the cell interval to 5. After that, the count is decremented by one with each time slot. When cell 2 arrives at time t=t2, the count is 3, which is greater than the fluctuation tolerance value $\tau$ ($\tau$=2). In this case, it is decided that the timing of arrival of cell 2 is too early relative to the parameters declared at the time of setting up a connection. The cell 2 is regarded as a nonconforming cell.

When a nonconforming cell is detected in the monitor mode, the rate of flow of cells is recognized as having exceeded the monitor rate. In the control mode, on the other hand, the cell flow rate is recognized as having exceeded the monitor rate and moreover the nonconforming cell is discarded or subjected to tagging.

When cell 3 arrives at time t=t4, the count is 1, which is smaller than the fluctuation tolerance value τ. In this case, it is decided that the time interval between the time (t=t0) of arrival of the last conforming cell and the time of arrival of cell 3 conforms to the monitor rate. The cell 3 is regarded as a conforming cell.

Subsequently, by repeating such processing, a conformity/nonconformity decision is made for each of incoming cells. Each time a nonconforming cell is detected, predetermined processing is carried out.

A configuration for realizing the UPC/NPC monitor and control by a virtual scheduling (VS) technique has also been proposed. In the virtual scheduling technique, when a certain cell arrives, reference is made to its time of arrival to set logical cell arrival times TAT that specify times when subsequent cells are expected to arrive. When the actual arrival time of a cell is prior to the corresponding logical cell arrival time, the cell is regarded as a nonconforming cell. Thus, the expected value T of the interval between cells in the leaky bucket technique and the logical cell arrival time TAT in the virtual scheduling technique are the same in concept and hence the two techniques are substantially identical.

FIG. 18A is a flowchart for the cell conformity/nonconformity decision in the leaky bucket technique, while FIG. 18B is a flowchart for the cell conformity/nonconformity decision in the virtual scheduling technique. These algorithms are adapted to cell conformity testing and described in CCITT Recommendation I.371 (CCITT Report COM XVIII-R 117, July, 1992) or TTC Standards JT-T. 371 Appendix. CITTI is now ITU-T.

Hereinafter, the flowchart for the leaky bucket technique will be described. This flowchart indicates a process of making a decision of whether a cell that arrived at time ta is a conforming one or a nonconforming one.

In step S1, the elapsed time from the time of arrival of a cell that was regarded as a conforming one last time to the time ta is calculated and the calculated value is subtracted from the count in the leaky bucket counter at the time of arrival of the last conforming cell.

In step S2, an examination is made as to whether the value (X') obtained in step S1 is smaller than 0. When X' is smaller than 0, the value is made 0 in step S3 and the procedure goes to step S5. If X' is not smaller than 0, then an examination is made in step S4 as to whether X' is greater than the fluctuation tolerance value τ. If X' is not greater than the fluctuation tolerance value, then X'+the expected value T of the cell interval is placed in the counter and a cell arriving at this time ta is regarded as a conforming one in step S5. The time ta is set as the time of arrival of a cell that was regarded as a conforming one last time.

If, on the other hand, X' is greater than the fluctuation permissible value, then that cell is regarded as a nonconforming one in step S6.

For example, supposing that the time of arrival of a cell that was regarded as a conforming one last time is time t0 shown in FIG. 17, X' for cell 2 that arrived at time t2 is calculated in step S1 to be $X'=5-(2-0)=3$ Thus, the cell 2 corresponds to case 3 and is regarded as a nonconforming one. For cell 3 that arrives at time t4, X' is calculated in step S1 to be $X'=5-(4-0)=1$ Thus, the cell 3 corresponds to case 2 and is regarded as a conforming cell.

Figure 19:
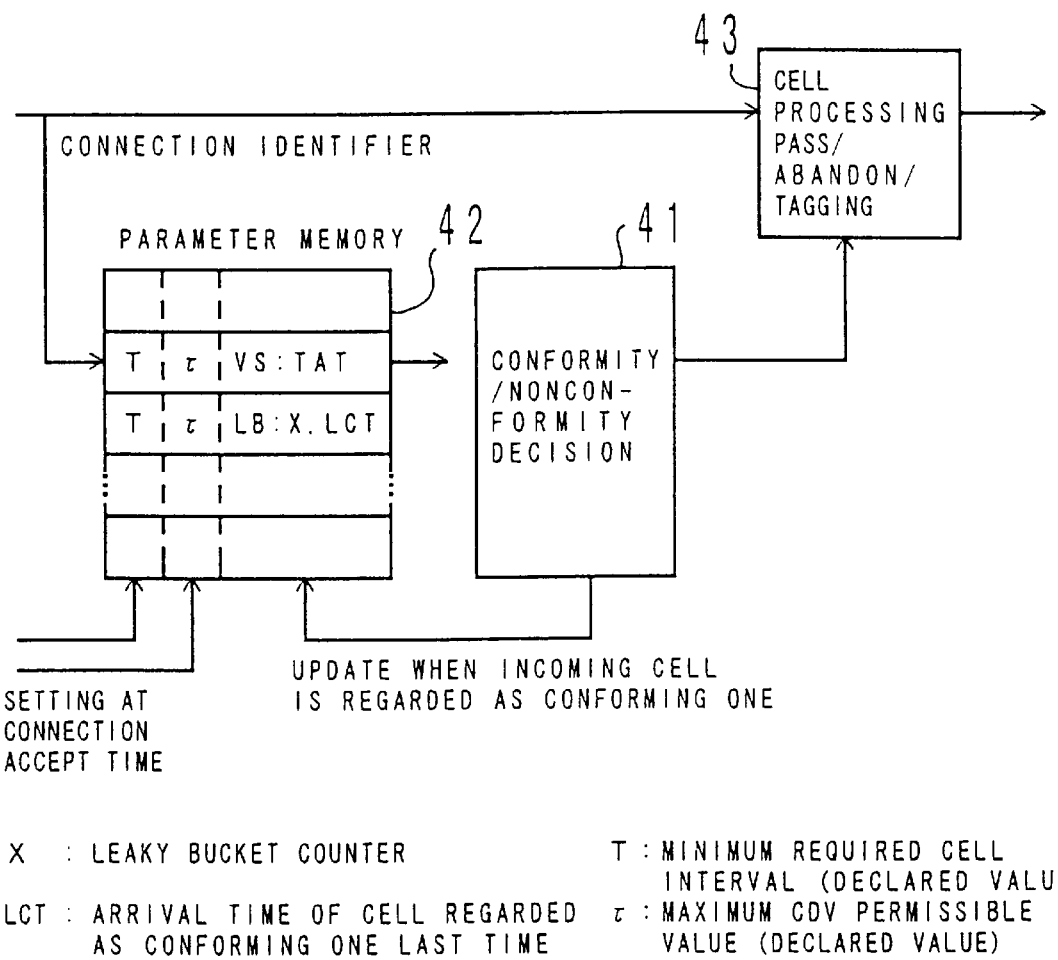
FIG. 19 shows an arrangement of the UPC/NPC that makes a conformity/nonconformity decision shown in FIG. 18.

FIG. 19 shows an arrangement of the UPC/NPC that carries out the conformity/nonconformity decision process shown in FIG. 18.

A conformity/nonconformity decision unit 41 carries out the conformity/nonconformity decision process by the leaky bucket or the virtual scheduling technique shown in FIG. 18. In the case of the leaky bucket technique, the unit has a leaky bucket counter.

A parameter memory 42 stores parameters and the like used by the conformity/nonconformity decision unit 41. That is, the expected value T of the cell interval and the fluctuation tolerance value τ are set on the basis of parameters including a transfer rate declared at the time of setting up a connection. Also, the parameter memory 42 stores values updated in the decision process by the conformity/nonconformity decision unit 41. For example, in the leaky bucket technique, the count X in the leaky bucket counter and the time LCT of arrival of a cell that was regarded as a conforming one last time are updated when step S5 in FIG. 18 is carried out.

A cell processing unit 43 processes cells in accordance with the results of decision by the conformity/nonconformity decision unit 41. That is, the cell processing unit 43 causes conforming cells to pass through and discards or performs the above-described tagging process on non-conforming cells in the control mode.

When a cell arrives at the UPC/NPC, reference is made to its VPI/VCI to identify the connection. The connection identifier is then used to make access to the parameter memory 42. Using parameters fetched from the parameter memory 42, the conformity/nonconformity decision unit 41 performs the conformity/nonconformity decision process shown in FIG. 18 for that cell and then informs the cell processing unit 43 of the results of the decision. The cell processing unit 43 processes the cell in accordance with the results of the decision.

FIG. 20 shows a practical arrangement of the UPC/NPC. This UPC/NPC has a function of switching between the monitor mode and the control mode in addition to the arrangement of FIG. 19.

A conformity/nonconformity decision unit 51 is basically the same as the conformity/nonconformity decision unit 41 and performs the decision process shown in FIG. 18. In the monitor mode, however, it does not notify the cell processing unit 43 that an incoming cell is a nonconforming one. In addition, it counts the number of times in a given time interval (e.g., one second) nonconforming cells were detected and writes it into a parameter memory 52. That is, the frequency of nonconforming cells is calculated to update the NG frequency in the parameter memory 52.

The parameter memory 52, which is basically the same as the parameter memory 42 of FIG. 19, stores the NG frequency indicating the frequency of nonconforming cells and a threshold value of the frequency of nonconforming cells. The NG frequency is detected by the conformity/nonconformity decision unit 51. The threshold value is set in advance.

An NG frequency decision unit 53 makes a decision of whether the UPC/NPC is to be operated in the control mode or in the monitor mode in accordance with the NG frequency updated by the conformity/nonconformity decision unit 51 and the threshold value. For example, when the NG frequency is above the threshold value, the UPC/NPC is operated in the control mode; otherwise, it is operated in the monitor mode. The result of this decision is presented to the conformity/nonconformity decision unit 51.

When a cell arrives at the UPC/NPC, reference is made to its VPI/VCI to identify the connection (or connection group). The connection identifier (or the connection group identifier) is then used to make access to the parameter memory 52. Using parameters fetched from the parameter memory 52, the conformity/nonconformity decision unit 51 performs the conformity/nonconformity decision procedure shown in FIG. 18 for that cell. When the decision is nonconformity, the frequency of nonconforming cells in that connection (or connection group) is calculated to update the NG frequency in the parameter memory 52.

The NG frequency decision unit 53 makes a decision of whether the UPC/NPC is to be operated in the control mode or in the monitor mode in accordance with the NG frequency and the threshold value. The result of this decision is presented to the conformity/nonconformity decision unit 51.

When operated in the monitor mode, the conformity/ nonconformity decision unit 51 does not notify the cell processing unit 43 that an incoming cell is a nonconforming cell. In the control mode, however, it notifies the cell processing unit 43 of the result of the conformity/ nonconformity decision procedure of FIG. 18, i.e., whether an incoming cell is a conforming cell or a nonconforming cell. The cell processing unit 43 processes the cell accordingly.

In the above configuration, the operation mode of the UPC/NPC is switched in accordance with the frequency of nonconforming cells. However, it is also possible to set the operation mode fixed. For example, in the first mode shown in FIG. 6, the operation mode is fixed to the monitor mode. Further, in the ninth to eleventh modes of FIGS. 14 to 16, the operation mode of the UPC/NPCs for the connection groups is fixed to the control mode.

It is also possible to forcibly set the operation mode for each connection or connection group in accordance with other factors than the detected frequency of nonconforming cells. For example, in the second mode shown in FIG. 7, the operation mode of the UPC/NPCs for the connection groups (1, 1) and (2, 1) is switched forcibly to the control mode as a result of the output line #1 having become congested. This mode switching operation is performed as instructed by the processor 34 that controls the switching unit.

According to the cell flow rate monitor and control system of the present embodiment, the rate of flow of cells can be monitored not only on a connection-by-connection basis but also on a connection-group-by-connection-group basis. If the arrangement is set such that the cell flow rate is controlled only on a connection-group-by-connection-group basis, then the unused bandwidth of a connection the usage of which is low can be allocated to another connection. If, on the other hand, it is desired that the used bandwidth be regulated strictly for each connection, then it is required only that the cell flow rate be controlled on a connection-by-connection basis.

Figure 21:
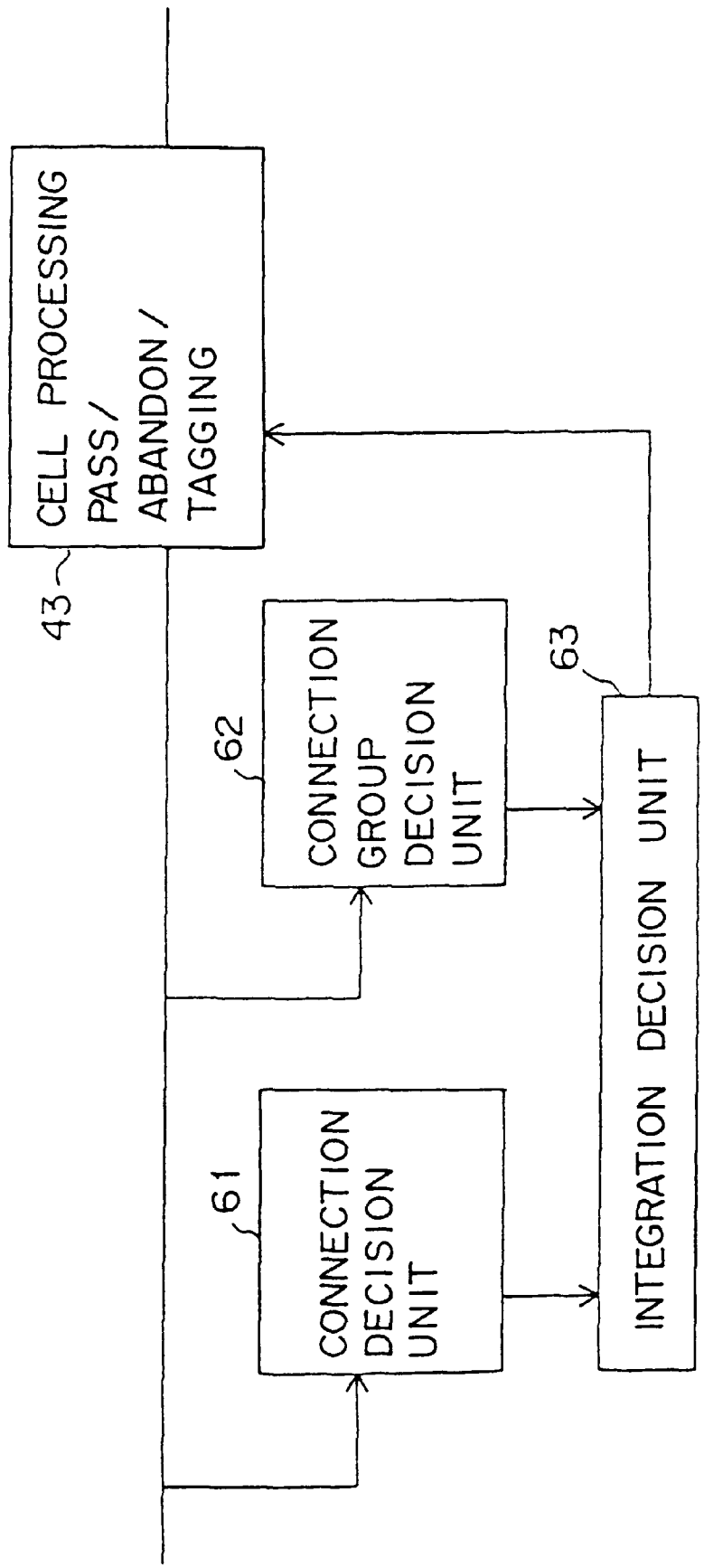
FIG. 21 shows an arrangement of a cell flow-rate monitor system on a connection and connection group basis.

FIG. 21 shows an arrangement for cell flow rate monitor and control on a connection-by-connection basis and on a connection-group-by-connection-group basis. A connection decision unit 61 is constructed from the conformity/ nonconformity decision unit 51, the parameter memory 52, and the NG frequency decision unit 53, which are shown in FIG. 20. This unit makes a conformity/nonconformity decision for each cell in each connection and sets the mode of operation for each connection. A connection group decision unit 62 is constructed from the decision unit 51, the NG frequency decision unit 53, and the parameter memory 52 for storing parameters for each connection group. The parameters for each connection group can be created from parameters declared for each connection. The connection group decision unit 62 performs the conformity/ nonconformity decision and the mode setting for each connection group.

An integration decision unit 63 instructs the cell processing unit 43 to pass or discard (or tagging) an incoming cell in accordance with the results of the decisions by the connection decision unit 61 and the connection group decision unit 62.

In the first to fifth modes shown in FIGS. 6 to 10, use may be made of the result of the decision by the connection group decision unit 62 only. In the sixth to eighth modes shown in FIGS. 11 to 13, on the other hand, use may be made of the result of the decision by the connection decision unit 61 only.

In order for the UPC/NPC to identify which connection (or connection group) an incoming cell has been transferred over, reference is made to the VPI/VCI placed in its header. The bit configuration of VPI/VCI is such that, in UNI, VPI is 8 bits long and VCI is 16 bits long, while, in NNI or INI, VPI is 12 bits long and VCI is 16 bits long. Thus, a table that covers all such VPI/VCI will require a very large amount of memory space, i.e., a memory space of $2^{24}$ or $2^{28}$. For this reason, within the switching unit ICIDs (Internal Connection IDs) are used to identify connections (or connection groups).

Figure 22:
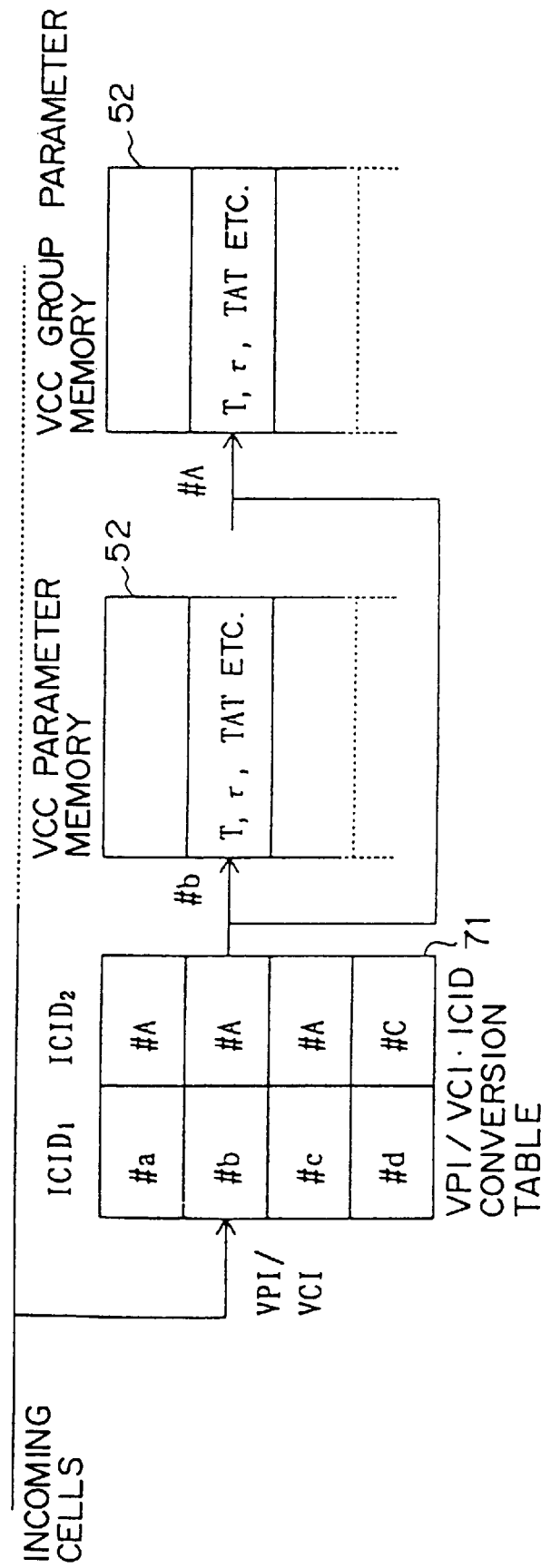
FIG. 22 shows a VPI/VCI-ICID conversion table and parameter storage memories.

FIG. 22 shows a VPI/VCI to ICID conversion table and parameter memories.

The VPI/VCI to ICID conversion table 71 is set up when a connection is established. That is, when a connection is established, ICID1 and ICID2 are allocated for VPI/VCI which specifies that connection and written into the VPI/ VCI to ICID conversion table 71. The ICID1 indicates an identifier by each connection, while the ICID2 indicates an identifier by each connection group. In the example of FIG. 22, connections #a, #b and #c belong to connection group #A and connection #d belongs to connection group #C.

The VCC parameter memory (parameter memory for storing parameters by connection) stores, in its location addressed by ICID1, parameters associated with the connection corresponding to the ICID1. The VCC group parameter memory (parameter memory for storing parameters by connection group) stores, in its location addressed by ICID2, parameters associated with the connection group corresponding to the ICID2.

When a cell arrives at the UPC/NPC configured as described above, the VPI/VCI in it is used to make access to the VPI/VCI to ICID conversion table 71 to fetch the ICID1 and ICID2. In the example of FIG. 22, #b is fetched as the ICID1 and #A is fetched as the ICID2. Parameters are read from each parameter memory using those identifiers as key addresses. The parameters are then used to make a conformity/nonconformity decision for the incoming cell.

Figure 23:
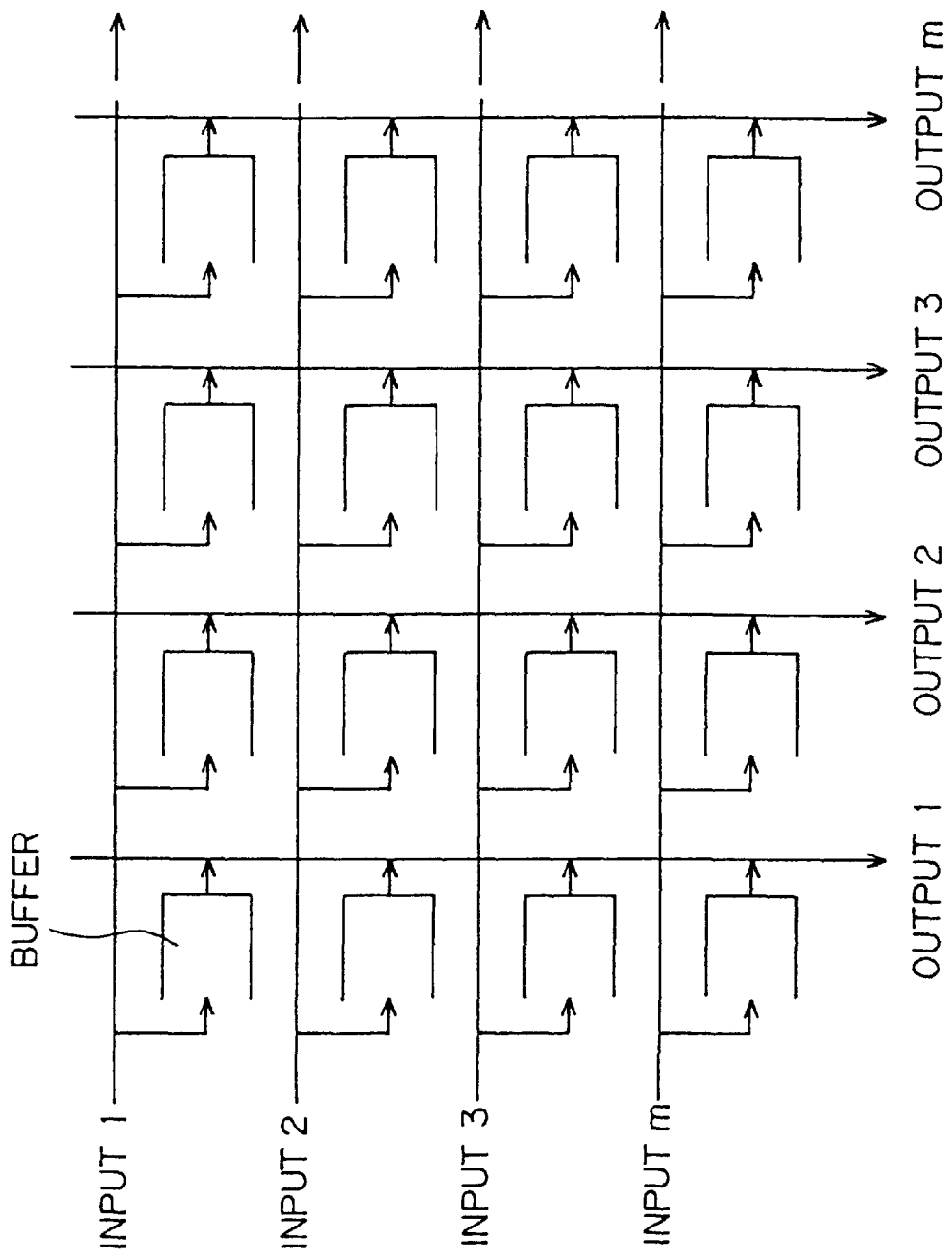
FIG. 23 shows an arrangement of a crosspoint type switch.
Figure 24:
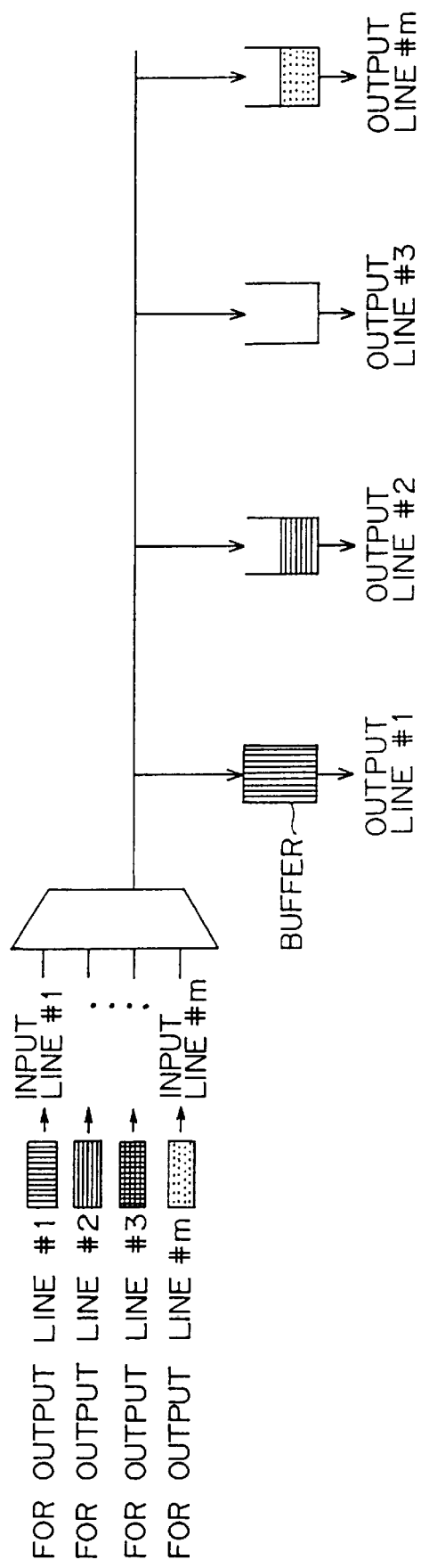
FIG. 24 shows an arrangement of an output buffer type switch.
Figure 25:
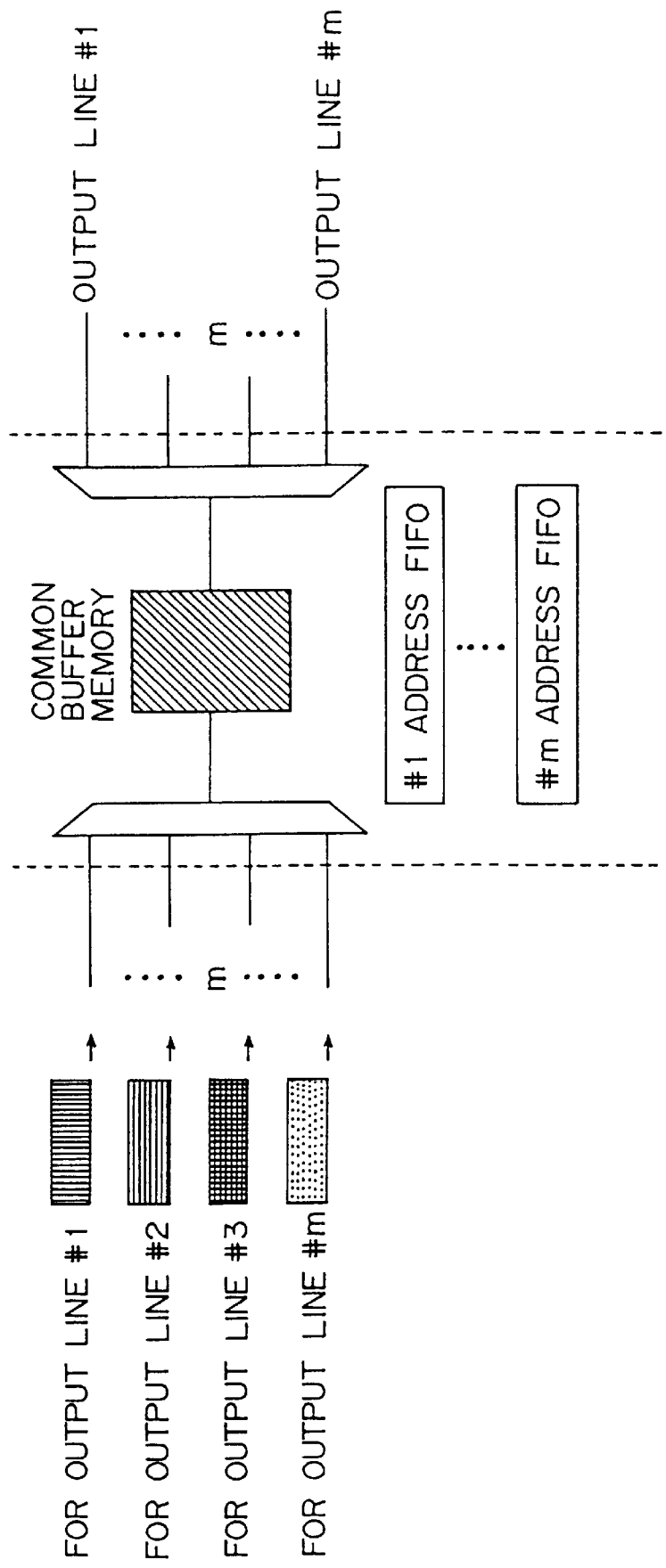
FIG. 25 shows an arrangement of a common buffer type switch.

FIGS. 23, 24 and 25 show the channel configuration of each of typical ATM switching units. FIG. 23 shows the configuration of a cross point type switching unit in which there is provided a buffer at each intersection of input and output lines. In the case of a switch of m×m configuration, there are provided m number of buffers on each output line.

FIG. 24 shows the configuration of an output buffer type switching unit which has a buffer for each output line. Cells input from input lines #1 to #m are multiplexed for transfer to each buffer. Each buffer has a filtering function and captures and stores cells to be output onto the output line connected to that buffer. These cells are read out onto the output line at predetermined timing.

FIG. 25 shows the configuration of a common buffer type switching unit in which all of cells input from input lines #1 to #m are written into a common buffer. At this point, cell write addresses (addresses of area to be written into) are written into address FIFOs provided for each of output lines. The addresses are fetched from the address FIFOs at timing conforming to the physical bandwidth of the respective output lines (i.e., time slots) and the cells are read from the common buffer by using the fetched addresses.

Figure 26:
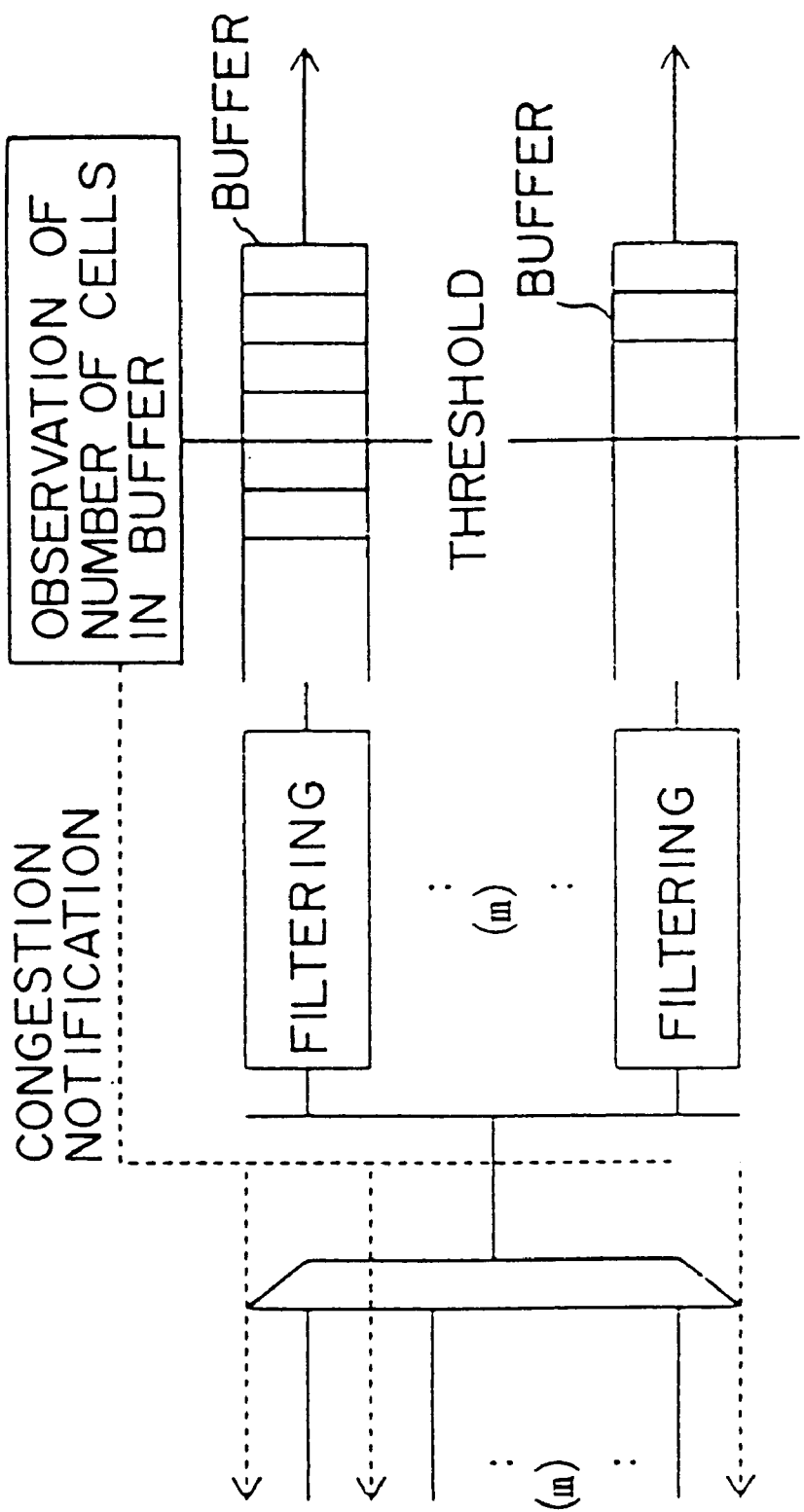
FIG. 26 illustrates a system for monitoring the congestion of outgoing lines in the output buffer type switch.

Next, the facility to detect the congestion of output lines will be described. FIG. 26 illustrates a method which, used in the output buffer type switching unit described with reference to FIG. 24, monitors the congestion of output lines.

With this method, a threshold value is set in a respective one of the output buffers. When the amount of cells stored in the buffer corresponding to an output line exceeds its threshold value, that output line is regarded as having become congested. The UPC/NPC is notified of the congestion thus detected. This notification is a direction to switch the mode of UPC/NPC provided for a given connection (or connection group) from the monitor mode to the control mode.

In the common buffer type switching unit, a threshold value is set in each of the address FIFOs shown in FIG. 25. When the number of addresses stored in an address FIFO (the length of a queue) exceeds the threshold, the corresponding output line is regarded as having become congested.

The UPC/NPC can be used to detect the congestion of each output line. In this case, information about the frequency of nonconforming cells detected by the UPC/NPC is utilized.

The processor that controls the switching unit recognizes all the connections (or connection groups) established on an output line. Thus, by operating the UPC/NPC in the monitor mode, the number of nonconforming cells on that output line can be estimated on the basis of information about the frequency of nonconforming cells in all the connections (or the connection groups) established on the output line. The congestion of the output line is monitored by the estimated value of the number of nonconforming cells on the output line.

According to the invention, as described above, the cell flow rate monitor and control operation is performed by connection group, thus allowing the hardware configuration to be simplified.

Since the resources (bandwidths) can be shared among connections multiplexed within a connection group, when the usage of one or more connection is low, cells can be transferred at a rate higher than the monitor rate using a bandwidth allocated for another connection.

When a traffic volume in a connection directed to one output line is less than the presumed volume, the unused bandwidth of that output line can be used for the traffic in another connection, thus allowing effective utilization of the resources.

In the event of congestion, the operation mode is switched from the monitor mode to the control mode to discard nonconforming cells, thus allowing quick recovery from the congestion with the degradation in service quality held to a minimum.

When congestion occurs, a connection that is causing the congestion is identified and only that connection is subjected to traffic regulation, thus allowing recovery from the congestion with services to other connections guaranteed.

When congestion occurs on an output line, its bandwidth is equally distributed to connections associated with the output line and traffic regulation is performed for each connection using the distributed bandwidth. This eliminates the need of estimating the traffic volume for each connection, ensuring the simplification of operation and impartial resource allocation.

What is claimed is:

1. A packet flow rate monitor and control system for monitoring and controlling the rate of flow of fixed-length packets having routing information into a network which routes each of the packets according to the routing information, comprising:

connection group definition means for defining connection groups each of which is composed of at least one connection;

a plurality of monitor means, provided for each of the connection groups defined by said connection group definition means, for monitoring the rate of flow of packets transferred over a respective one of said connection groups; and control means for causing said plurality of monitor means to operate in either a monitor mode to monitor whether or not the rate of flow of packets exceeds a threshold set in advance or a control mode in which, when the rate of flow of packets exceeds the threshold, packets the flow rate of which exceeds the threshold are discarded or priority of packets is decreased, wherein said control means controls the operation mode of each of said plurality of monitor means, based on the rates of flow of packets monitored by all of said plurality of monitor means.

2. The system according to claim 1, wherein said network has a switching unit to which at least one input line and at least one output line are connected, said connection group definition means defines a connection group for connections directed from an input line i among said at least one input line to an output line j among said at least one output line, said monitor means sets a predicted traffic volume for the connection group directed from the input line i to the output line j as the threshold for the connection group, and said control means causes said plurality of monitor means to operate in the monitor mode.

3. The system according to claim 2, wherein, when an output line becomes congested, said control means switches the operation mode of monitor means provided for a connection group that transfers packets to the congested output line to the control mode.

4. The system according to claim 2, wherein, when an output line becomes congested, said control means detects a connection group which, of connection groups that transfer packets to the congested output line, has a packet flow rate in excess of the threshold on the basis of the results of monitoring by said plurality monitor means and switches the operation mode of monitor means provided for the detected connection group to the control mode.

5. The system according to claim 1, wherein said network has a switching unit to which at least one input line and at least one output line are connected, said connection group definition means defines a connection group for connections directed from an input line i among said at least one input line to an output line j among said at least one output line, and when an output line becomes congested, said control means recognizes the number of connection groups that transfer packets to the congested output line, calculates a value by dividing a predicted traffic volume for the congested output line by the recognized number of connection groups, sets the calculated value in monitor means provided for each of said connection groups that transfer packets to the congested output line as the threshold, and switches the operation mode of said monitor means to the control mode.

6. The system according to claim 3, wherein a buffer is provided for each of said at least one output line, and a decision is made as to whether or not the corresponding output line becomes congested on the basis of the number of packets stored in said buffer.

7. A packet flow rate monitor and control system for monitoring and controlling the rate of flow of fixed-length packets having routing information into a network which routes each of the packets according to the routing information, comprising:

connection group definition means for defining connection groups each of which is composed of at least one connection;

monitor means, provided for each of the connection groups defined by said connection group definition means, for monitoring the rate of flow of packets transferred over a respective one of said connection groups; and control means for causing said monitor means to operate in either a monitor mode to monitor whether or not the rate of flow of packets exceeds a threshold set in advance or a control mode in which, when the rate of flow of packets exceeds the threshold, packets the flow rate of which exceeds the threshold are discarded or priority of packets is decreased, wherein said network has a switching unit to which at least one input line and at least one output line are connected, and when an output line becomes congested, said control means switches the operation mode of monitor means provided for a connection group that transfers packets to the congested output line to the control mode, and switches the operation mode of monitor means provided for a connection group defined on the same input line as the connection group switched to the control mode to the control mode.

8. A packet flow rate monitor and control system for monitoring and controlling the rate of flow of fixed-length packets having routing information into a network which routes each of the packets according to the routing information, comprising:

connection group definition means for defining connection groups each of which is composed of at least one connection;

monitor means, provided for each of the connection groups defined by said connection group definition means, for monitoring the rate of flow of packets transferred over a respective one of said connection groups;

control means for causing said monitor means to operate in either a monitor mode to monitor whether or not the rate of flow of packets exceeds a threshold set in advance or a control mode in which, when the rate of flow of packets exceeds the threshold, packets the flow rate of which exceeds the threshold are discarded or priority of packets is decreased; and wherein said monitor means detects the frequency at which the packet flow rate in a connection group corresponding to said monitoring means exceeds the threshold and makes a decision of whether or not the connection group becomes congested on the basis of the detected frequency.

9. A packet flow rate monitor and control system for monitoring and controlling the rate of flow of fixed-length packets having routing information into a network which routes each of the packets according to the routing information, comprising:

a plurality of monitor means, provided for each of connections, for monitoring the rate of flow of packets transferred over a respective one of said connections; and control means for causing said plurality of monitoring means to operate in either a monitor mode to monitor whether or not the rate of flow of packets exceeds a threshold set in advance or a control mode in which, when the rate of flow of packets exceeds the threshold, packets the flow rate of which exceeds the threshold are discarded or priority of the packets is decreased;

wherein said control means controls the operation mode of each of said plurality of monitor means based on the rates of flow of packets monitored by all of said plurality of monitor means.

10. The system according to claim 9, wherein said control means causes said plurality of monitor means to operate in the monitor mode.

11. The system according to claim 10, wherein said network has a switching unit to which at least one input line and at least one output line are connected, and when an output line becomes congested, said control means switches the operation mode of monitor means provided for connections that transfer packets to the congested output line to the control mode.

12. The system according to claim 10, wherein said network has a switching unit to which at least one input line and at least one output line are connected, and when an output line becomes congested, said control means detects a connection which, of connections that transfer packets to the congested output line, has a packet flow rate in excess of the threshold on the basis of the results of monitoring by said plurality of monitor means and switches the operation mode of monitor means provided for the detected connection to the control mode.

13. The system according to claim 9, wherein said network has a switching unit to which at least one input line and at least one output line are connected, and when an output line becomes congested, said control means recognizes the number of connections that transfer packets to the congested output line, calculates a value by dividing a predicted traffic volume for the congested output line by the recognized number of connections, sets the calculated value in monitor means provided for each of said connections that transfer packets to the congested output line as the threshold, and switches the operation mode of said monitor means to the control mode.

14. A packet flow rate monitor and control system for monitoring and controlling the rate of flow of fixed-length packets having routing information into a network which routes each of the packets according to the routing information, comprising:

a plurality of monitor means, provided for each of connections, for monitoring the rate of flow of packets transferred over a respective one of said connections; and control means for causing said monitor means to operate in either a monitor mode to monitor whether or not the rate of flow of packets exceeds a threshold set in advance or a control mode in which, when the rate of flow of packets exceeds the threshold, packets the flow rate of which exceeds the threshold are discarded or priority of packets is decreased, wherein said network has a switching unit to which at least one input line and at least one output lines are connected, and when an output line becomes congested, said control means switches the operation mode of monitor means provided for connections that transfer packets to the congested output line to the control mode, and switches the operation mode of monitor means provided for a connection established on the same input line as the connection switched to the control mode to the control mode.

15. A packet flow rate monitor and control system for monitoring and controlling the rate of flow of fixed-length packets having routing information into a network which routes each of the packets according to the routing information, comprising:

monitor means, provided for each of connections, for monitoring the rate of flow of packets transferred over a respective one of said connections; and control means for causing said monitor means to operate in either a monitor mode to monitor whether or not the rate of flow of packets exceeds a threshold set in advance or a control mode in which, when the rate of flow of packets exceeds said threshold, packets the flow rate of which exceeds the threshold are discarded or priority of the packets is decreased, wherein said monitor means detects the frequency at which the packet flow rate in a connection corresponding to said monitor means exceeds the threshold and makes a decision of whether or not the connection becomes congested on the basis of the detected frequency.

16. A packet flow rate monitor and control system for monitoring and controlling the rate of flow of fixed-length packets having routing information into a network which routes each of the packets according to the routing information, comprising:

a plurality of connection monitor means, provided for each of connections, for monitoring the rate of flow of packets transferred over the corresponding connection;

a plurality of connection group monitor means, provided for each of connection groups which are each composed of at least one connection, for monitoring the rate of flow of packets transferred over the corresponding connection group; and control means for causing said plurality of connection monitor means and said plurality of connection group monitor means to operate in either a monitor mode to monitor whether or not the rate of flow of packets exceeds a threshold set in advance or a control mode in which, when the rate of flow of packets exceeds said threshold, packets the flow rate of which exceeds the threshold are discarded or priority of the packets is decreased, wherein said control means controls the operation mode of each of said plurality of connection monitor means and each of said plurality of connection group monitor means based on the rates of flow of packets monitored by all of said plurality of connection group monitor means and by all of said plurality of connection monitor means.

17. The system according to claim 16, wherein each of said connection monitor means is set as the threshold with a predicted traffic volume in the corresponding connection, and each of said connection group monitor means is set as the threshold with the sum of predicted traffic volumes in all connections included in the corresponding connection group.

18. The system according to claim 16, wherein each of said plurality of connection monitor means is set as the threshold with a declared bandwidth for the corresponding connection, and each of said plurality of connection group monitor means is set as the threshold with the sum of declared bandwidths for all connections included in the corresponding connection group.

19. The system according to claim 16, wherein said control means causes said connection monitor means to operate in the monitor mode.

20. The system according to claim 19, wherein said control means causes said plurality of connection group monitor means to operate in the control mode.

21. The system according to claim 20, wherein when the rate of flow of packets exceeds a threshold in a connection group, said control means switches the operation mode of each of said connection monitor means provided for connections included in the connection group to the control mode.

22. The system according to claim 20, wherein when a connection group becomes congested, said control means switches the operation mode of each of connection monitor means provided for connections included in the congested connection group to the control mode.

23. The system according to claim 20, wherein when the rate of flow of packets exceeds a threshold in a connection group, said control means detects a connection which, of connections included in the connection group, has a packet flow rate in excess of the threshold on the basis of the results of monitoring by said connection monitor means and switches the operation mode of connection monitor means provided for the detected connection to the control mode.

24. The system according to claim 20, wherein when a connection group becomes congested, said control means detects a connection which, of connections included in the congested connection group, has a packet flow rate in excess of the threshold on the basis of the results of monitoring by said connection monitor means and switches the operation mode of connection monitor means provided for the detected connection to the control mode.

25. The system according to claim 16, wherein when, in a connection group, the rate of flow of packets is below the threshold, said control means causes connection group monitor means corresponding to the connection group to operate in the control mode and stops the operation of connection monitor means corresponding to connections included in the connection group, and when, in the connection group, the rate of flow of packets exceeds the threshold, said control means recognizes the number of connections included in the connection group, calculates a value by dividing a predicted traffic volume in the connection group by the recognized number of connections, sets each of connection monitor means corresponding to all connections included in the connection group with the calculated value as the threshold, and causes said connection monitor means to operate in the control mode.

26. A packet flow rate monitor and control system for monitoring and controlling the rate of flow of fixed-length packets having routing information into a network which routes each of the packets according to the routing information, comprising:

connection monitor means provided for each of connections, for monitoring the rate of flow of packets transferred over the corresponding connection;

connection group monitor means, provided for each of connection groups which are each composed of at least one connection, for monitoring the rate of flow of packets transferred over the corresponding connection group; and control means for causing said connection monitor means and said connection group monitor means to operate in either a monitor mode to monitor whether or not the rate of flow of packets exceeds a threshold set in advance or a control mode in which, when the rate of flow of packets exceeds said threshold, packets the flow rate of which exceeds the threshold are discarded or priority of the packets is decreased, wherein said connection group monitor means detects the frequency at which the rate of flow of packets in the corresponding connection group exceeds the threshold and makes a decision of whether or not the connection group becomes congested on the basis of the detected frequency.

27. A packet flow rate monitor and control method, for monitoring and controlling the rate of flow of packets having routing information into a network which routes each of the packets according to the routing information, said method comprising the steps of:

defining a connection group including at least one connection according to the routing information;

monitoring the rate of the packets transferred over each of connection groups;

monitoring the rate of flow of the packets transferred over each of connections;

causing the monitoring operation for the connection group to operate in a control mode, in the control mode, when a congestion is occurred, packets the rate of which exceeds a threshold are discarded or priority of the packets is decreased; and causing the monitoring operation for the connection to operate in a monitor mode, in the monitor mode, a decision is made as to whether or not the congestion is occurred, the congestion is detected according to a frequency that the rate flow of packets exceeds the threshold.

28. The method according to claim 27, further comprising the step of:

causing, when a connection group is congested, a monitoring operation for a connection belonging to the congested connection group to operate in the control mode.

29. The method according to claim 27, further comprising the steps of:

detecting, when a connection group is congested, a connection of which the rate of flow of packets exceeds the threshold among connections belonging to the congested connection group;

causing a monitoring operation for the detected connection to operate in the control mode.

* * * * *